(12) United States Patent
Sakakibara et al.

(10) Patent No.: US 6,958,835 B2
(45) Date of Patent: Oct. 25, 2005

(54) IMAGE INPUTTING APPARATUS AND IMAGE FORMING APPARATUS USING FOUR-LINE CCD SENSOR

(75) Inventors: Jun Sakakibara, Tokyo (JP); Koji Tanimoto, Kawasaki (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 941 days.

(21) Appl. No.: 09/955,090

(22) Filed: Sep. 19, 2001

(65) Prior Publication Data

US 2003/0053157 A1    Mar. 20, 2003

(51) Int. Cl.$^7$ .............................................. H04N 1/46
(52) U.S. Cl. .................... 358/514; 358/512; 358/515; 358/483; 358/446; 358/497; 358/474; 358/486
(58) Field of Search ................. 358/514, 512, 358/513, 505, 446, 445, 483, 482, 486, 497, 358/494, 474, 515; 382/270, 312, 318, 319, 382/162, 167; 250/208.1, 226, 234–236; 355/32; 399/211, 212

(56) References Cited

U.S. PATENT DOCUMENTS

| | | | | |
|---|---|---|---|---|
| 5,583,667 A | * | 12/1996 | Yamada | 358/529 |
| 5,721,628 A | * | 2/1998 | Takaragi et al. | 358/518 |
| 5,894,356 A | * | 4/1999 | Yoo | 358/515 |
| 5,973,802 A | * | 10/1999 | Hirota et al. | 358/521 |
| 6,804,033 B1 | * | 10/2004 | Hara | 358/522 |

FOREIGN PATENT DOCUMENTS

| | | |
|---|---|---|
| JP | 10-56577 | 2/1998 |
| JP | 10-136151 A | 5/1998 |
| JP | 2000-287036 | 10/2000 |

* cited by examiner

Primary Examiner—Cheukfan Lee
(74) Attorney, Agent, or Firm—Foley & Lardner LLP

(57) ABSTRACT

A four-line CCD sensor is structured by line sensors R, G, B in which color filters are respectively disposed on surfaces of light receiving elements, and a line sensor BK at which no color filter is disposed. Amplitudes of signals which are outputted from the line sensors R, G, B at a time of reading a color document, and an amplitude of a signal which is outputted from the line sensor BK at a time of reading a monochrome document are adjusted so as to be substantially equal to one another. In a case in which a color document is read, outputs of the line sensors R, G, B are selectively provided, and in a case in which a monochrome document is read, output of the line sensor BK is selectively provided.

20 Claims, 20 Drawing Sheets

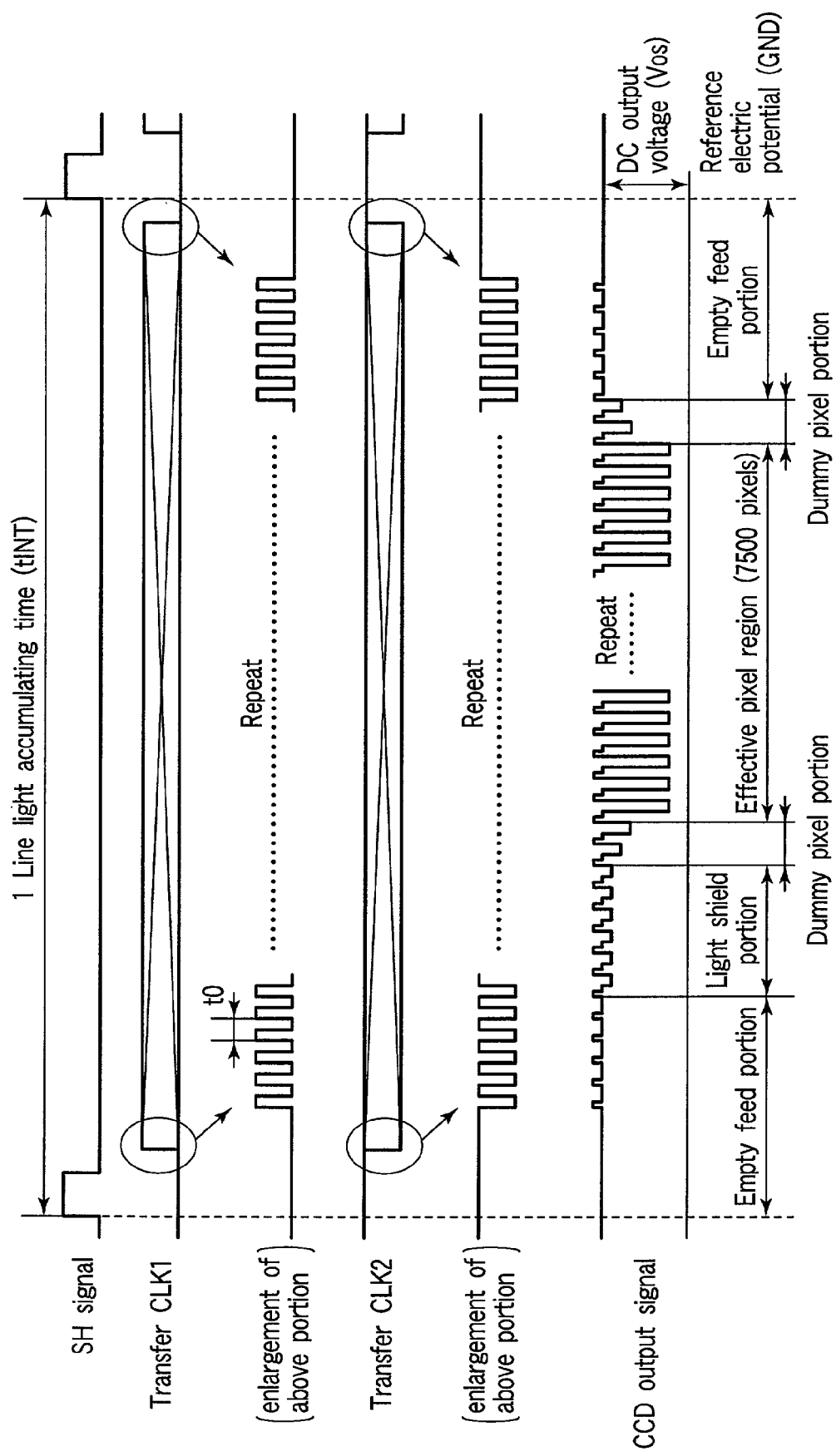
F I G. 8

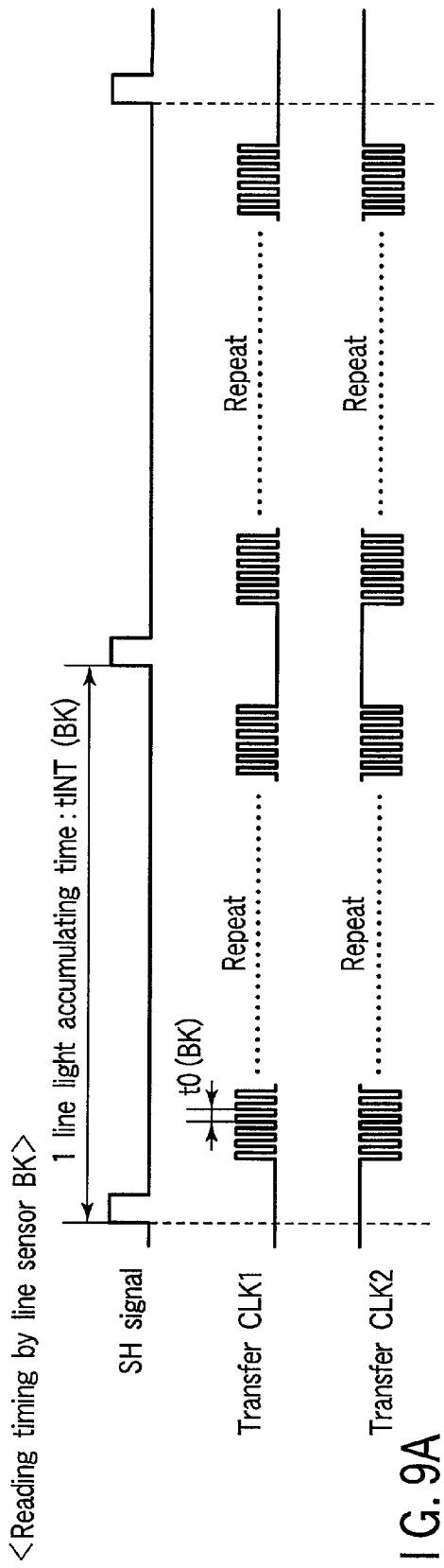
F I G. 9A
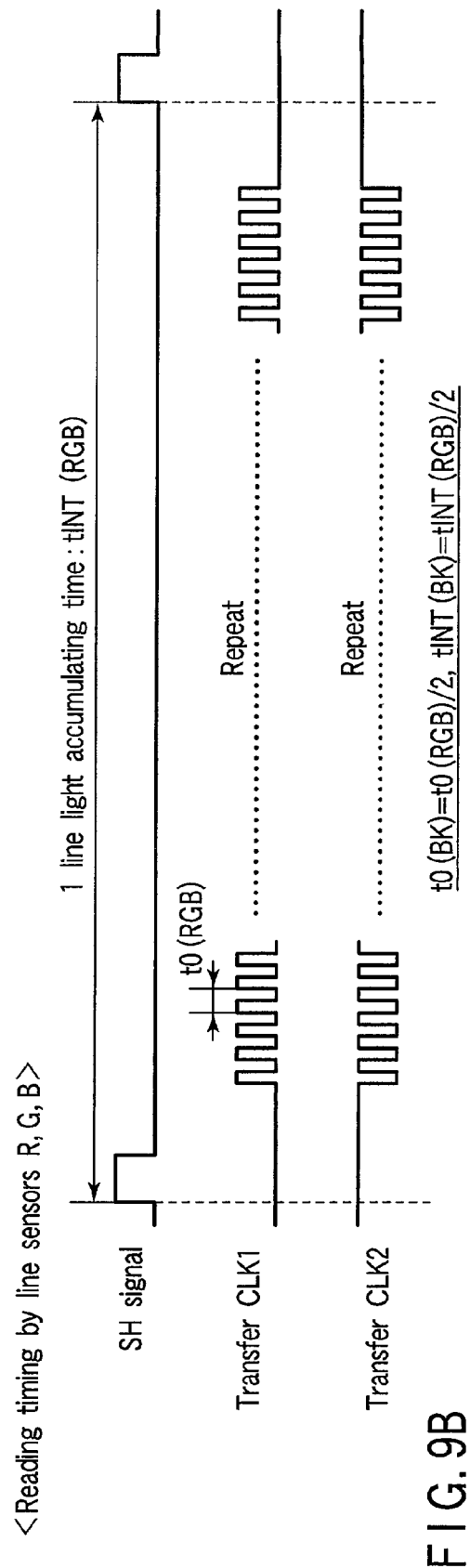
F I G. 9B $Vout = Vin \times (1+B/A) - Vref \times B/A$ $Vout = Vin \times (1+B/A)$, (Vref : at the time of GND grounding)

$Vout = -(Vin - Vref) \times B/A$

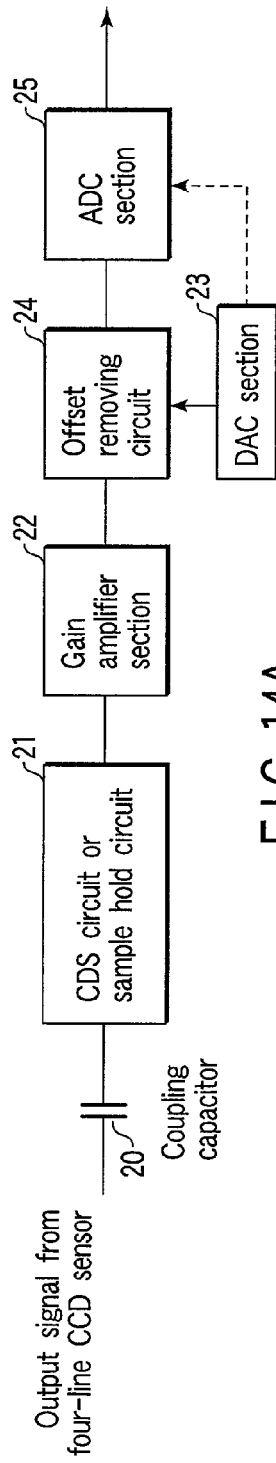
F I G. 14A
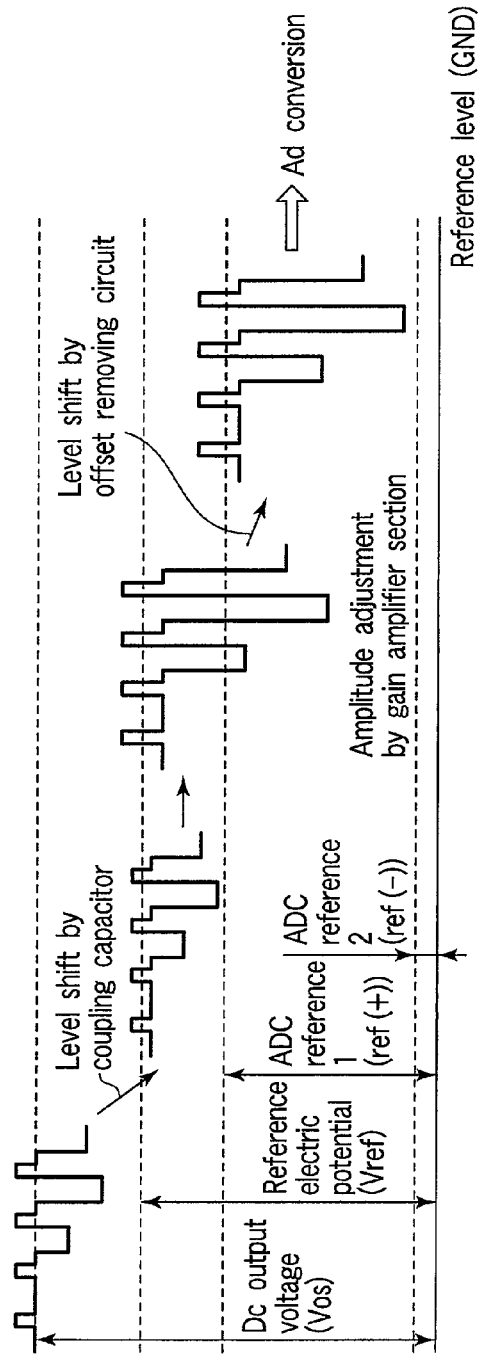
F I G. 14B

IMAGE INPUTTING APPARATUS AND IMAGE FORMING APPARATUS USING FOUR-LINE CCD SENSOR

BACKGROUND OF THE INVENTION

The present invention relates to an image inputting apparatus such as a scanner or the like which reads image information by scanning a document, and to an image forming apparatus such as a digital copier or the like which uses the image inputting apparatus.

Conventionally, there are generally two types of CCD line sensors which are used in a reduction optical system: a CCD line sensor which is structured by only a one-line line sensor, and a CCD line sensor which is structured by a three-line line sensor in which color filters of red (hereinafter denoted as R), green (hereinafter denoted as G), and blue (hereinafter denoted as B) are disposed on the surfaces of the respective line sensors.

The aforementioned one-line CCD line sensor is basically used for reading monochrome (white/black) documents. When a color document is read by using this CCD line sensor, a method is adopted in which, by successively turning on three light sources having spectral characteristics of R, G, B which are three primary colors of light, the image information of the color document is divided into color information of R, G, B and read. Further, there is a method which uses a light source whose spectrum characteristic is white, and color filters of R, G, B are disposed on the optical path from the light source to the line sensor, and by switching the color filters, the color information which is incident on the line sensor is separated.

The aforementioned three-line CCD line sensor is basically used for reading color documents. For the light source in this case, a light source which has a spectral characteristic which sufficiently covers the visible light region from oscillation wavelengths of 400 nm to 700 nm is used. The division of the color information of R, G, B is carried out by the color filters which are disposed on the surfaces of the respective line sensors.

Further, when a monochrome document is read by using the three-line line sensor, there are cases in which one output among the three line sensors, generally, the line sensor output of G, is used in order to reliably read a vermilion impression, and there is a method in which white/black information is generated by using all of the outputs of the three line sensors.

When color information is read by a CCD sensor which is structured by a one-line sensor, as described above, a method of the switching light sources or switching the color filters is used. Thus, there are disadvantages in that the control of the light source relationships is complicated, and costs accompanying such control increase.

When single color information is read by using one line sensor output of a CCD sensor which is structured by a three-line sensor, for example, in a case in which the line sensor having sensitivity of G is used, as described above, information in vermilion can be read. However, the green color information and the white information on the document cannot be distinguished from one another, and as a result, information of green characters or images or the like cannot be read. In the same way, in a case in which the line sensor having sensitivity of R is used, a drawback arises in that the red information cannot be read, and in a case in which the line sensor having sensitivity of B is used, a drawback arises in that the blue information cannot be read.

In a case in which white/black information is generated by using all of the outputs of the three line sensors, because the three line CCD sensor is arranged such that the three line sensors are disposed to be physically separate from one another, the respective line sensors cannot read the information at the same area. Accordingly, in order to correct the offset of the positions, it is necessary to effect correction in line units by using line buffers.

Further, at the time of reading, if the distances between the lines of the three line sensors are in a proportional relationship which is an integer multiple of a one-line reading range in the subscanning direction on the document, precise alignment can be achieved by the aforementioned line buffers. However, because the one-line reading range in the subscanning direction varies in accordance with the reading magnification, there is the problem that the above-described proportional relationship is not established, and the alignment of color information by the line buffers is poor. Moreover, in a case in which an image is rapidly changed from white to black or from black to white such as a monochrome characters, the drawback that false colors such as red or blue are generated at the changing points arises.

SUMMARY OF THE INVENTION

The object of the present invention is to provide an image inputting apparatus and an image forming apparatus which can read color information of a document, and can provide image data in which positional offset and false colors do not arise in a case in which a monochrome document is read.

In order to achieve the above-described object, in the present invention, the image inputting apparatus is formed by using a four-line CCD sensor in which a one-line sensor, which is for reading a monochrome document, and a three-line sensor, which is for reading a color document and in which color filters of R, G, B are respectively disposed on the light receiving surfaces, are disposed in the same device.

Because the four-line CCD sensor is formed by line sensors at which color filters are disposed and a line sensor at which no color filter is disposed, the sensitivities which are the photoelectric converting efficiencies of the respective line sensors greatly differ.

The present invention is for correcting the aforementioned differences in sensitivities by signal processing.

In a case in which a color document is read, by using the three line sensors at which color filters are disposed, the transferring speed of the image signal is set to be lower than that at the time when a monochrome document is read by one line sensor at which no color filter is disposed, and the light accumulating time of one line is made long.

Further, in a case in which a color document is read, by using the three line sensors at which color filters are disposed, the illuminance of the document surface is set to be higher than that in a case in which a monochrome document is read by one line sensor at which no color filter is disposed.

The image inputting apparatus has two light sources as means for controlling the aforementioned illuminance of the document surface. Reading operation is carried out by turning on the two light sources at the time of reading a color document, or by turning on one of the two light sources at the time of reading a monochrome document.

When a processing for optimizing the outputted analog signal from the four-line sensor to the input amplitude of the subsequent stage analog/digital converter is carried out, the amplification factor of the gain amplifier which amplifies the output signal of a line sensor at which a color filter is disposed is set to be higher than the amplification factor of the gain amplifier which amplifies the output signal of the line sensor at which no color filter is disposed.

The photoelectric converting efficiency (sensitivity) of the line sensor at which no color filter is disposed is high as compared with those of the three line sensors at which the color filters of R, G, B are respectively disposed. Thus, the line sensor can be driven at high speed. Further, because the photoelectric converting efficiency of the line sensor at which no color filter is disposed is high, the output signal of the line sensor is divided into an even signal and an odd signal which are outputted as parallel signals of two systems, and the light accumulating time is shortened. Moreover, the even signal and the odd signal may be divided into two, and may be outputted as parallel signals of four systems.

The setting as to whether a document is to be read as a color document or as a monochrome document can be easily switched by a request from the user. Further, whether a document is a color document or a monochrome document can be detected by a document automatic detecting section, and the above-described reading operation can be switched.

BRIEF DESCRIPTION OF THE DRAWINGS

FIG. 8 shows a driving timing and an output signal waveform of a CCD sensor;

FIGS. 9A and 9B show reading timings per line sensor of the present invention;

FIGS. 14A and 14B show a processing circuit structure and a signal waveform of an analog signal which is outputted from a CCD sensor;

DETAILED DESCRIPTION OF THE PREFERRED EMBODIMENTS

Hereinafter, embodiments of the present invention will be described with reference to the figures.

Figure 1:
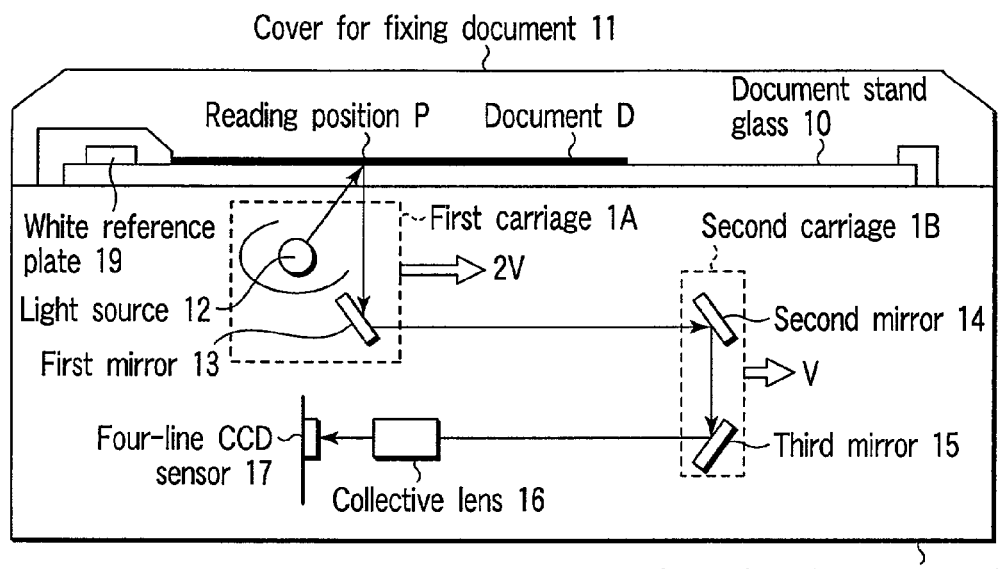
FIG. 1 shows the schematic structure of an image inputting apparatus using a four-line CCD sensor.

FIG. 1 shows the structure of an image inputting apparatus 1 relating to the present invention using four-line CCD sensor. The image inputting apparatus 1 is an apparatus which reads image information of a document at a scan line interval which corresponds to the resolution.

A document D is placed face down on a document stand glass 10. By closing a cover 11 for document fixing which is provided so as to be freely openable and closable, the document D is pressed onto the document stand glass 10. The document D is irradiated by a light source 12, and the reflected light from the document D is image-formed onto a sensor surface of a photoelectric converting element 17 via mirrors 13, 14, 15, and a collective lens 16. Due to a first carriage 1A, which is structured by the light source 12 and the mirror 13, and a second carriage 1B, which is structured by the mirrors 14, 15, being moved from the left toward the right by a motor for carriage driving which is not shown, the document D is scanned by the irradiated light from the light source 12. Further, by setting the moving speed of the first carriage 1A to be two times the moving speed of the second carriage 1B, the optical path length from the document D to the four-line CCD sensor 17 which is the photoelectric converting element is controlled so as to be constant.

In this way, the image of the document D which is placed onto the document glass 10 is, by the four-line CCD sensor 17 and per scan line, converted into an analog electric signal which corresponds to the light signal strength of the reflected light, and is successively read.

Figure 2:
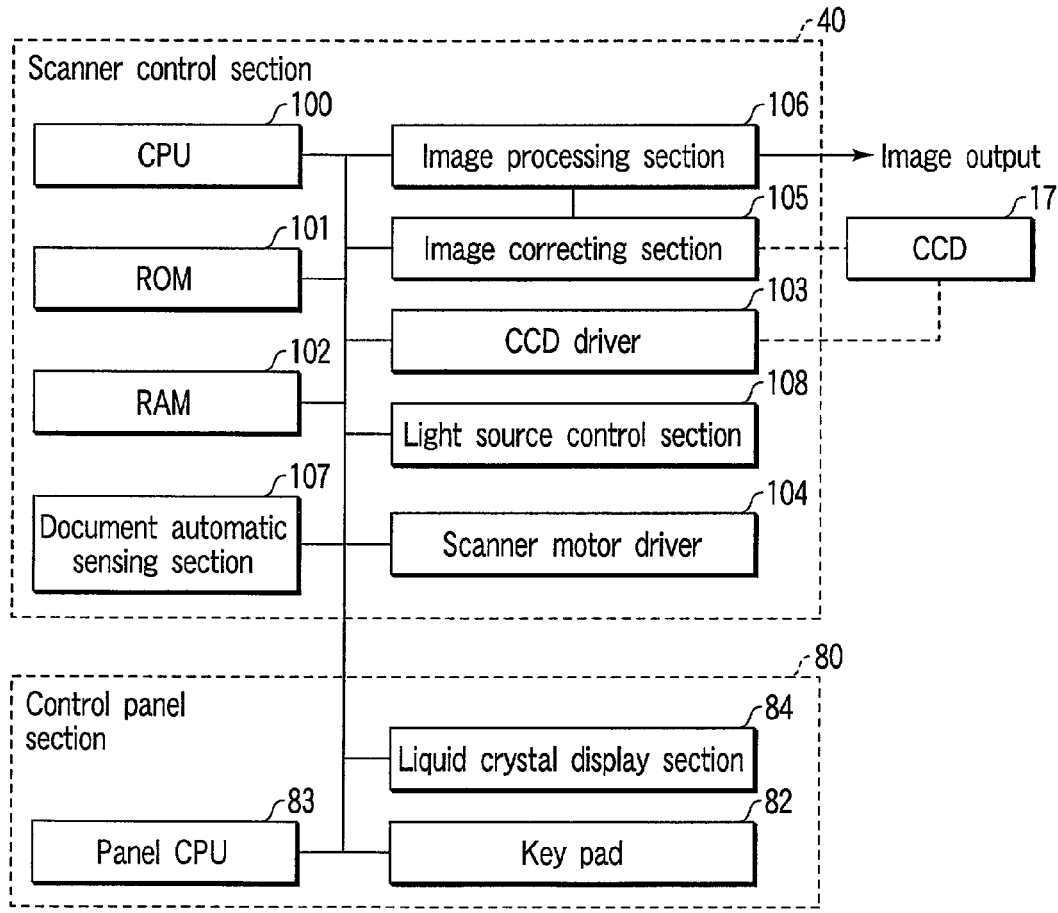
FIG. 2 is a block diagram showing the structure of a control system of the image inputting apparatus.

FIG. 2 is block diagram showing the structure of the control system of the image inputting apparatus 1. The image inputting apparatus 1 includes a scanner control section 40 and a control panel section 80.

The scanner control section 40 includes a CPU 100, a ROM 101, a RAM 102, a CCD driver 103, a scanner motor driver 104, an image correcting section 105, an image processing section 106, a document automatic sensing section 107, and a light source control section 108 which controls the light source 12. Moreover, the scanner control section 40 includes a driver, which is not illustrated, which drives a moving mechanism such as a mechanism which moves the collective lens 16 to the position which corresponds to the set magnification.

The CPU 100 controls the scanner control section 40 overall in accordance with a control program including the present invention which is stored in the ROM 101, and uses the RAM 102 for temporary storage of data. The CCD driver 103 drives the four-line CCD sensor 17, and the scanner motor driver 104 controls the rotation of the driving motor which moves the first and second carriages 1A and 1B and the like. The document automatic sensing section 107 automatically senses whether a document which is placed onto the document stand glass 10 is a color document or a monochrome document or single color document.

The image correcting section 105 includes an A/D converting circuit which converts an analog signal from the four-line CCD sensor 17 to a digital signal, and a shading correcting circuit and a gamma correcting circuit for correcting dispersion of the four-line CCD sensor 17 or fluctuations of a threshold level with respect to the output signal from the four-line CCD sensor 17 which are caused by temperature changes at the periphery or the like. Further, the image correcting section 105 includes a line memory which once stores the corrected digital signals from these correcting circuits. The image processing section 106 carries out image processings such as trimming, masking, enlargement/reduction processings, resolution conversion, image compression/decompression processings, and the like on the image data which is inputted from the image correcting section 105.

The control panel section 80 includes a key pad 82, a panel CPU 83, and a liquid crystal display section 84. A screen for setting document reading conditions or the like is displayed at the liquid crystal display section 84. The panel CPU 83 receives data relating to the document reading conditions which is key-inputted by a user via the key pad 82, and transfers the key-inputted data to the scanner control section 40, and displays the key-inputted data at the liquid crystal display section 84. The document reading conditions include the information of whether the document is to be read as a color document or as a monochrome document, and information on the resolution, and the like.

Figure 3A:
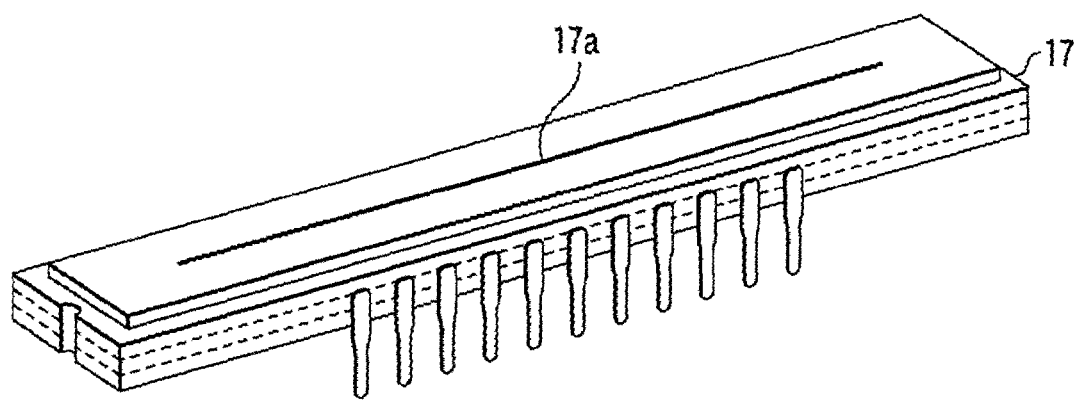
FIG. 3A shows a general view of the four-line CCD sensor.
Figure 3B:
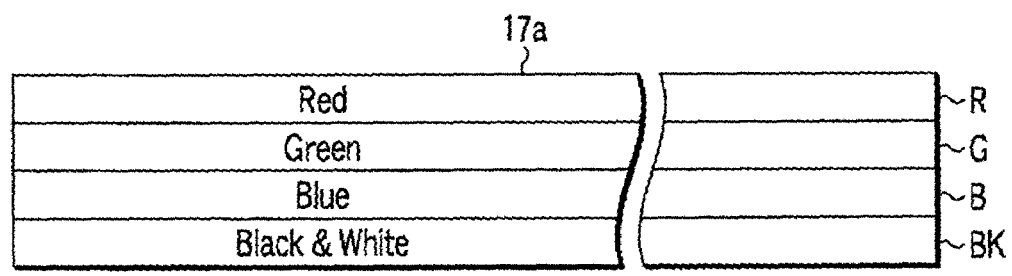
FIG. 3B shows the structure of a light receiving surface.

FIG. 3A is a general view of the four-line CCD sensor 17, and FIG. 3B is an enlarged view of a light receiving section 17a. In the four-line CCD sensor 17, at the light receiving section 17a of the line sensors, four sensors which are a line sensor BK at which no color filter is disposed, a line sensor R at which a filter having red color sensitivity is disposed, a line sensor B having blue color sensitivity, and a line sensor G at which a filter having a green color characteristic is disposed, are provided so as to be aligned. In each of the line sensors, for example, photodiodes, which serve as light receiving elements, are disposed at a pitch of 7μ.

At the four-line CCD sensor 17, the four line sensors are disposed so as to be aligned in this way. Thus, the position of each line sensor is physically offset. Accordingly, there is the problem that the same scan line on the document D cannot be read simultaneously by the four line sensors. This problem is usual for CCD line sensors which are formed by a plurality of line sensors using a reducing optical system. The positional offset of the image information which is read is corrected by a line memory or the like in the image correcting section 105.

Next, the characterizing features of the four-line CCD sensor 17 discussed above will be described.

Figure 4:
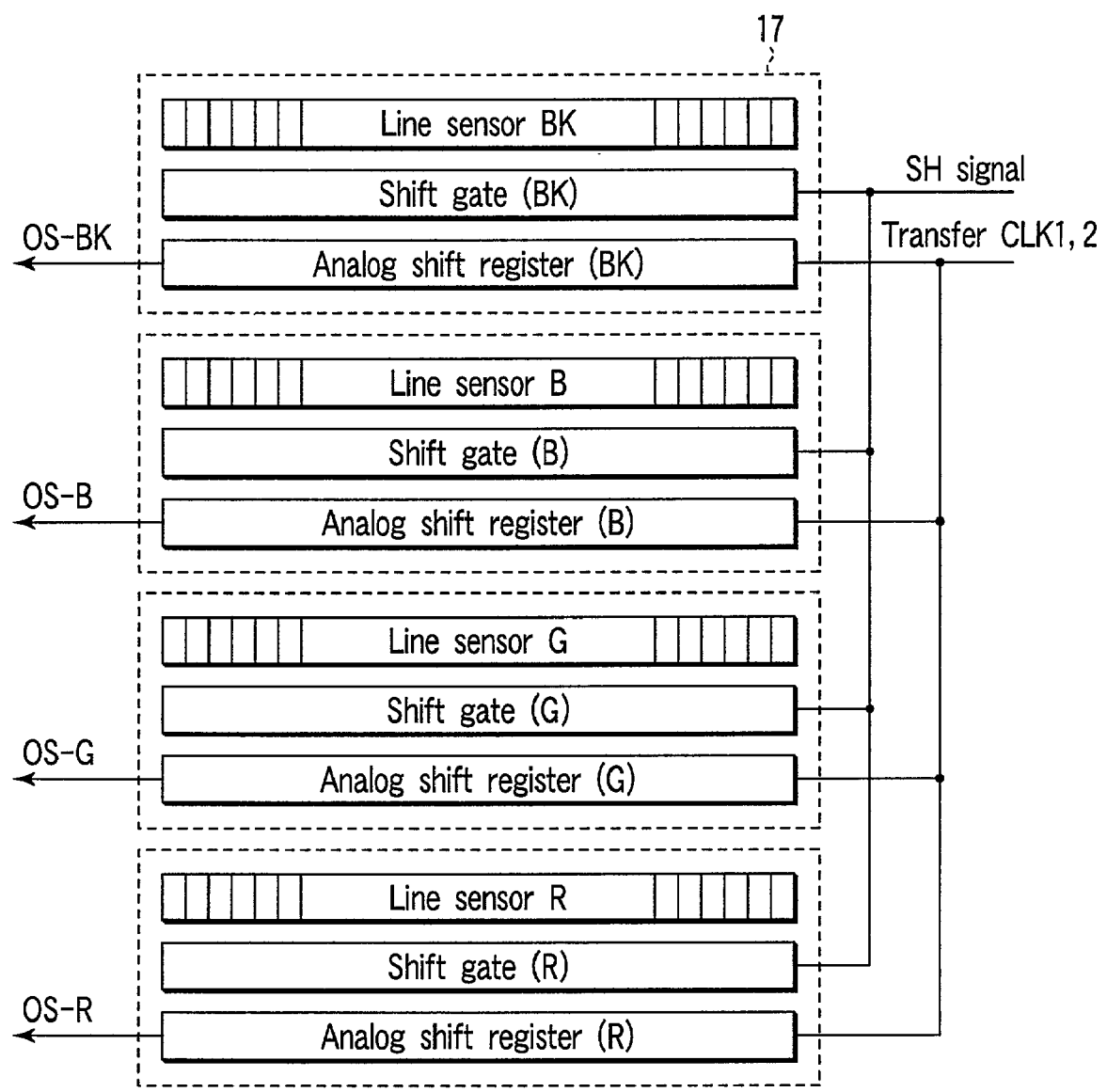
FIG. 4 shows the schematic structure of the fourline CCD sensor.
Figure 5:
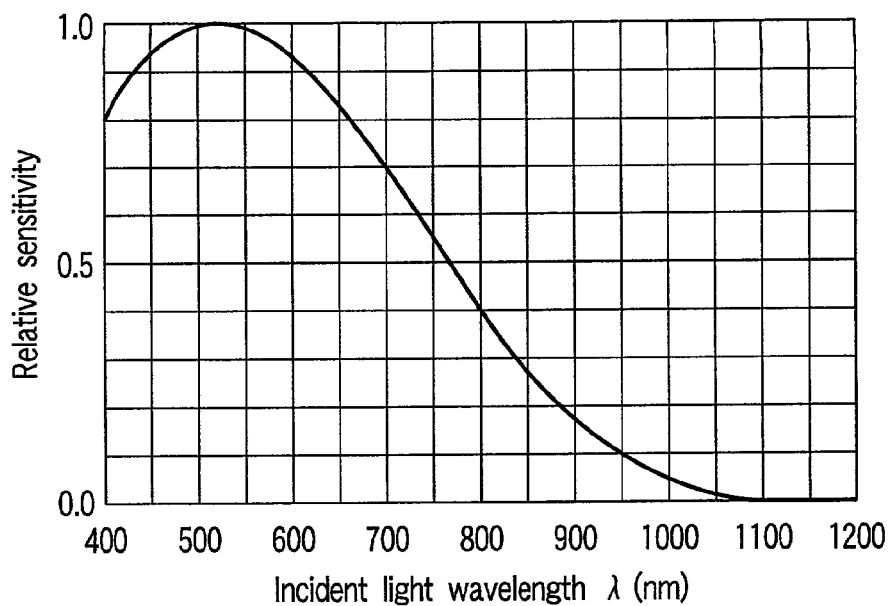
FIG. 5 shows a spectral sensitivity characteristic of a line sensor BK in the four-line CCD sensor.
Figure 6:
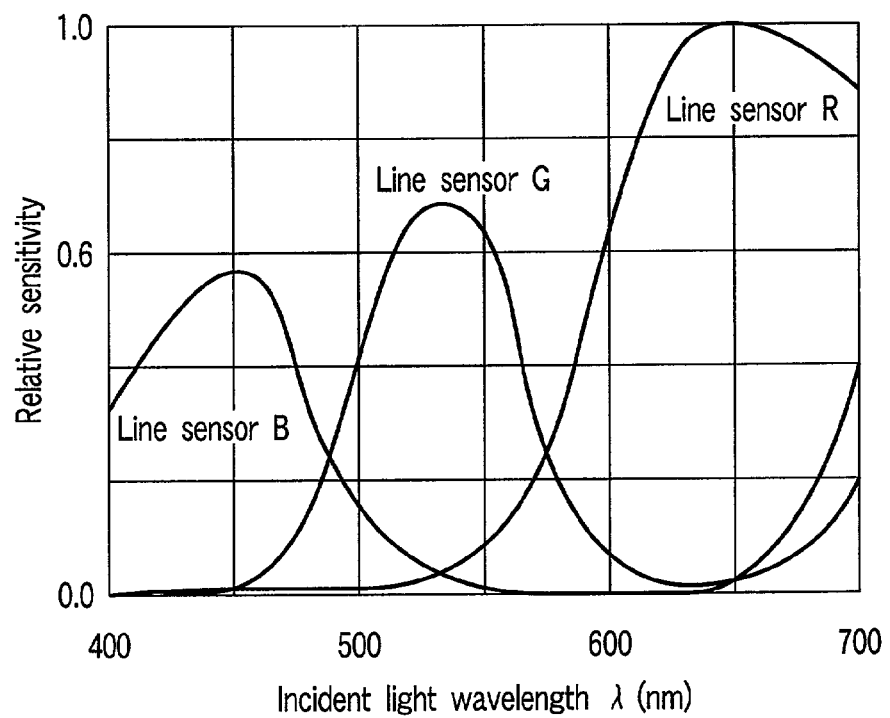
FIG. 6 shows a spectral sensitivity characteristics of line sensors R, G, B in the four-line CCD sensor.

FIG. 4 is a schematic structural view of the four-line CCD sensor 17, FIG. 5 shows a spectral sensitivity characteristic of the line sensor BK forming the four-line CCD sensor 17, and FIG. 6 shows the spectral sensitivity characteristics of the line sensors R, G, B.

As described above, the four-line CCD sensor 17 is formed by the line sensor BK, in which no color filter is disposed at the light receiving surface portion of the line sensor, and line sensors R, G, B at which color filters are disposed. As will be described later, when light is illuminated onto the line sensor, charges accumulate in accordance with the illuminated light amount and the illumination time at the light receiving elements which are disposed in a straight line. In response to an SH signal, the accumulated charges are supplied to an analog shift register via a shift gate. Synchronously with transfer clocks CLK1, 2, the analog shift register serially outputs the charges supplied from the respective light receiving elements.

Figure 7:
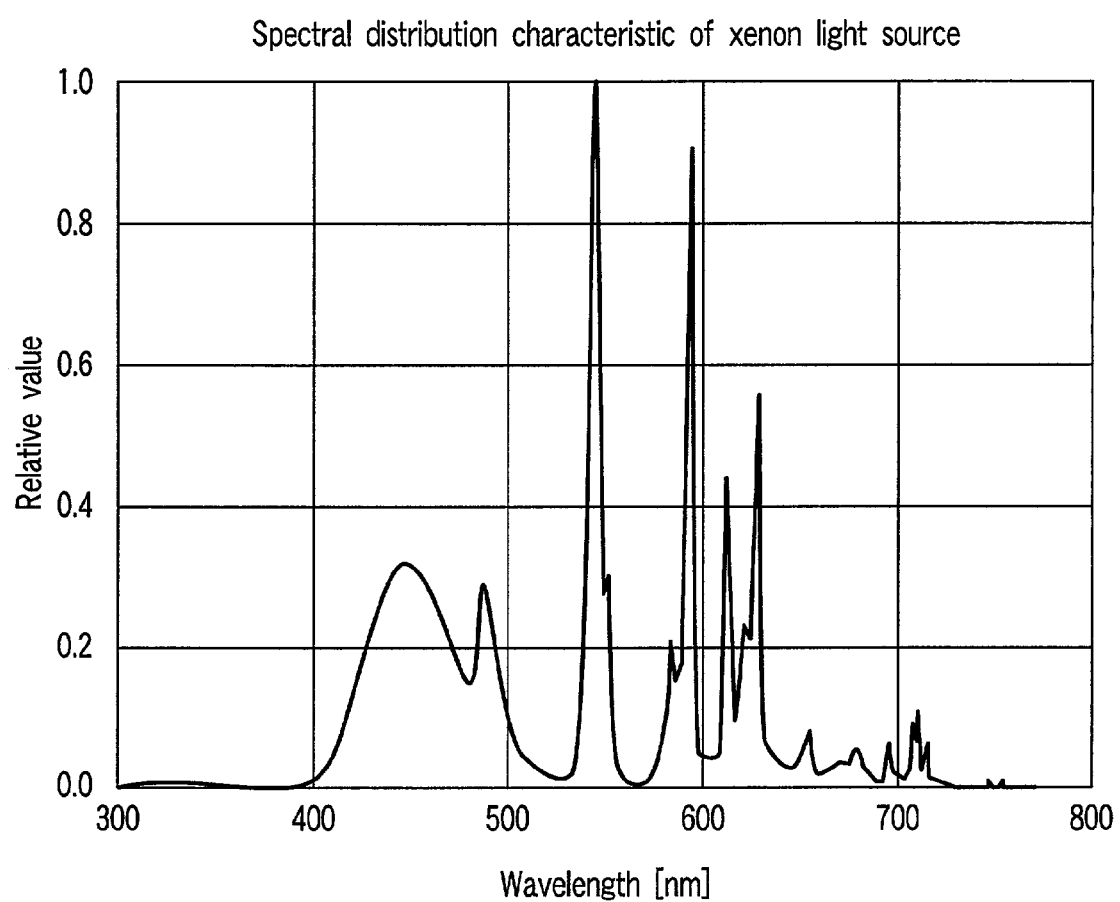
FIG. 7 shows a spectral distribution characteristic of a xenon light source which is an example of a light source.

When light is illuminated uniformly onto the line sensors, as shown in FIGS. 5 and 6, the line sensor R or the line sensor G or the line sensor B only has sensitivity with respect to wavelengths in a specific region, whereas the line sensor BK has sensitivity from a wavelength range of less than 400 nm to a portion exceeding 1000 nm. Accordingly, the analog signal amplitude which is outputted from the line sensor BK is greater than the analog signal amplitudes outputted from the line sensors R, G, B. For reference, an example of the spectral distribution of a Xenon light source is shown in FIG. 7.

Next, operation of the CCD line sensor will be described.

When the document D is, for example, an A4 size document, the document D has a surface area of 297 mm in the longitudinal direction and 210 nm in the short-side direction. When the document is read at a resolution of 600 dpi with the longitudinal direction being the main scanning direction and the short-side direction being the subscanning direction, the required number of effective pixels of the photodiode array of the four-line CCD sensor 17 is 7016 pixels at the minimum (4677 pixels at the time of 400 dpi). Generally, there are sensors of 7500 pixels (5000 pixels at the time of 400 dpi). Further, as shown in FIG. 8, the CCD line sensor has, at a portion of the photodiode array, a light shielding pixel portion which shields light and is formed of aluminum or the like, and dummy pixels, and an empty feed portion, so that light is not incident onto the stages before the 7500 pixels which are the effective pixels. Accordingly, a transfer CLK number which exceeds the 7500 pixels is needed in order to output to the exterior all of the charges accumulated in the CCD line sensor. Here, if the total of the light shielding pixel portion, the empty feed portion, and the dummy pixel portion, which are outside of the effective pixel region, is a transfer CLK number of 500, a time corresponding to 8000 transfer CLK is required in order to output to the exterior of the CCD line sensor all of the charges which have been accumulated in one line of the CCD line sensor. This time is the light accumulating time for one line (tINT).

Further, as the characterizing feature of the output signal of the CCD line sensor, a signal is outputted in the minus direction by using, as a reference, a voltage level which is offset by a given constant value with respect to an electrical reference level (GND). This voltage level which is a reference is called the signal output DC voltage (offset level; Vos).

Next, the internal operation of the four-line CCD sensor 17 will be described.

The light energy, which is illuminated onto the line sensor at the time when the SH signal within the one line light accumulating time (tINT) is "L" level, is accumulated as charges in the photodiodes. When the SH signal is "H" level, the accumulated charges pass through the shift gate which is adjacent to the photodiodes, and are transferred to the further adjacent analog shift register.

When this transfer operation is completed, the SH signal is made to be "L" level, and the shift gate is operated. The charge accumulating operation at the photodiodes is again started so that the charges do not leak to the exterior of the photodiodes.

The charges which are transferred to the analog shift register are transferred, in pixel units, to the exterior at the transfer CLK period. Due to this operation, the SH signal is applied such that the transfer CLK is stopped during the time that the charges which pass through the shift gate from the photodiodes move to the analog shift register.

The transfer CLK is always inputted, and even in cases in which the transfer CLK matches the SH signal at the interior of the CCD line sensor and the transfer CLK is stopped, the charge transfer operation at the interior is the same. Further, due to the CCD line sensor, there are cases in which the polarities of the above-described SH signal and the transfer CLK differ from FIG. 8, but the internal operation of the sensor is the same.

For example, assuming that the image transfer frequency f of the four-line CCD sensor 17 is 20 MHz, in order for all of the charges of one line which are accumulated in the four-line CCD sensor to be outputted to the exterior, a time of 8000 (CLKS)×(1/20 MHz)=400 µs is required. This time is the light accumulating time for one line in the subscanning direction of the four-line CCD sensor. (In FIG. 8, image transfer period: t0=1/f is shown.) Hereinafter, the relationship of the analog signal amplitude which is outputted from the four-line CCD sensor 17 with a transfer CLK frequency=20 MHz and a one line light accumulating time tINT=400 µs, will be described. Note that this transfer CLK frequency and one line light accumulating time of course differ in accordance with the specifications of the product.

The output signal amplitude of the line sensor BK, which shows white image information in a case in which the monochrome document D is read at a transfer frequency of 20 MHz by using the line sensor BK, is VBK (white). The output signal amplitude VR (white) of the line sensor R, the output signal amplitude VG (white) of the line sensor G, and the output signal amplitude VB (white), of the line sensor B in cases in which a white image of the color document is read at the same transfer frequency by the line sensor R, the line sensor G, and the line sensor B, are as follows.

VBK (white)>VR (white), VBK (white)>VG (white), VBK (white)>VB (white)

In a case in which these ratios are great and the noise component which is included in the signal is constant, the S/N ratios (the ratio of the noise component with respect to the effective signal) of VR (white), VG (white), and VB (white) are inferior compared to VBK (white).

Here, if the spectral sensitivities of the line sensors R, G, B (see FIG. 6) when the xenon light source having the spectral distribution characteristic of FIG. 7 is used are respectively 50% of the spectral sensitivity (see FIG. 5) of the line sensor BK, the following formulas are established.

*VBK* (white)/2=*VR* (white), *VBK* (white)/2=*VG* (white), *VBK* (white)/2=*VB (white)*

Therefore, if the amplitudes of the output signals of the line sensors R, G, B are double, a signal amplitude equivalent to the line sensor BK can be obtained, and as a result, it can be thought that the S/N ratio also is equivalent. The means for adjusting the signal amplitude of at least one of or desirably all of the output signals of the line sensors R, G, B to be the same as or substantially the same as the output signal amplitude of the line sensor BK, is a characterizing feature of the present invention.

A first embodiment of the present invention will be described hereinafter.

The sensitivity of a CCD line sensor is defined by using the illuminance which is incident per unit time as shown by [V/(lx·sec)]. Therefore, the light accumulating time of one line is changed at the time of using the line sensor BK, and at the time of using the line sensors R, G, B. This will be described specifically by using FIG. 9.

The SH signal and the transfer CLK 1, 2 which are shown in FIG. 9A are the same as the signals which are shown in FIG. 8. The SH signal is a signal which operates the shift gate at the inner portion of the four-line CCD sensor 17, and the transfer CLK 1, 2 are signals which carry out the control of the analog shift register. In a case in which image information is read by using the line sensor BK, as described above, if the frequency of the transfer CLK is 20 MHz, the light accumulating time tINT(BK) of one line is 400 µs.

Next, in a case in which image information is read by using the line sensors R, G, B, as shown in FIG. 9B, due to the frequency of the transfer CLK being set to 10 MHz which is ½ of the aforementioned frequency, the light accumulating time tINT(RGB) of one line is 800 µs, which is double the above. In this way, by lowering the image transfer frequency at the time of image reading by using the line sensors R, G, B whose sensitivities are less than the time of reading a monochrome image by using the line sensor BK, the amplitudes of the output signals of the line sensors R, G, B can be increased, and reading with a good S/N ratio can be carried out.

In the above description, for explanation, it was stated that the sensitivities of the line sensors R, G, B are ½ of the sensitivity of the line sensor BK. However, with other ratios as well, by changing the image frequency in accordance with the ratio, output signals from line sensors R, G, B having good S/N ratios can be provided. Further, the transfer clock frequency may be adjusted such that the signal amplitude which is outputted from the line sensor BK coincides with the signal having the largest amplitude among the output signals of the line sensors R, G, B.

Further, in a case in which the document D is single color, it is possible to read the document D only by the line sensor BK. At this time as well, control which is the same as at the time of reading a monochrome document D can be carried out.

Figure 10:
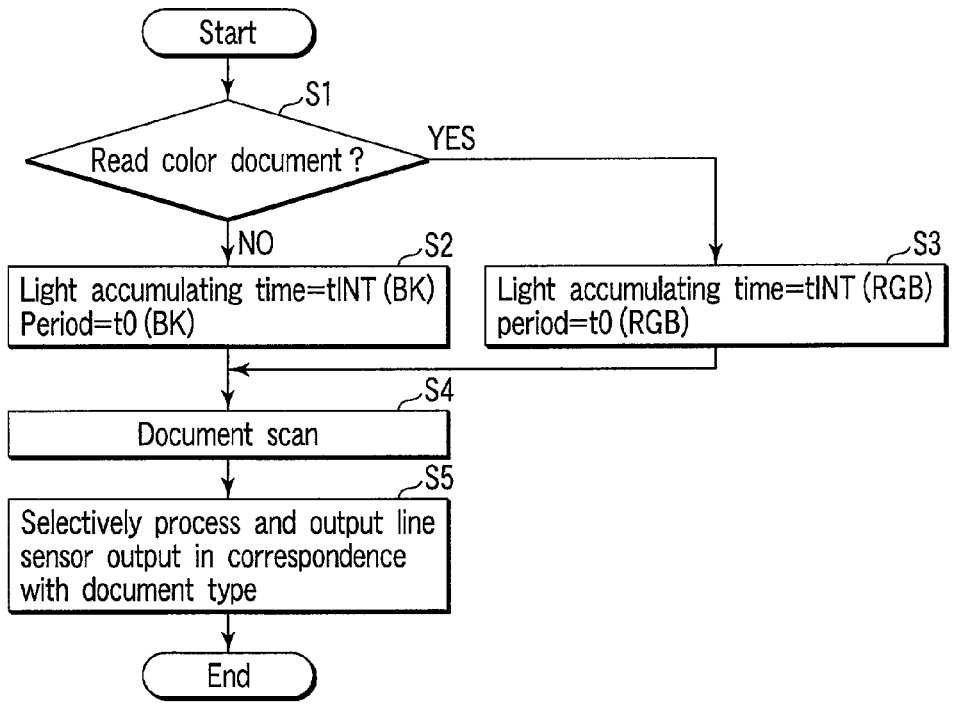
FIG. 10 is a flowchart showing the operation of a first embodiment.

FIG. 10 is a flowchart showing the operation of the present embodiment. In a case in which a document is scanned, the CPU 100 judges whether it is reading of a color document (step S1). Namely, in a case in which the type of the document D is set to be a monochrome document by the user via the control panel 80, or in a case in which it is judged to be a monochrome document by an automatic sensing section 108, the CPU 100 instructs the light accumulating time tINT(BK) and the transfer clock period t0(BK) to the CCD driver 103 (step S2), and carries out the reading operation by only the line sensor BK (step S4).

Further, in a case in which the type of the document D is set to be a color document by the user or it is judged to be a color document by the automatic sensing section 108, the CPU 100 instructs the light accumulating time tINT(RGB) and the transfer clock period t0(RGB) to the CCD driver 103 (step S3), and ignores the output signal from the line sensor BK, and carries out the reading operation by using the line sensors R, G, B (step S4).

The image signal which is provided from the four-line CCD sensor 17 is subjected to the above-described correcting processings at the image correcting section 105. In a case in which a color document is read, after the CPU 100 selects the output signals from the line sensors R, G, B and stores the output signals in the RAM 102, signal processing is carried out at the image processing section 106, and the processed signal is provided as the image output. Further, in a case in which a monochrome document is read, after the CPU 100 selects the output signal from the line sensor BK and stores the output signal in the RAM 102, signal processing is carried out at the image processing section 106, and the processed signal is provided as an image output (step S5).

Figure 11:
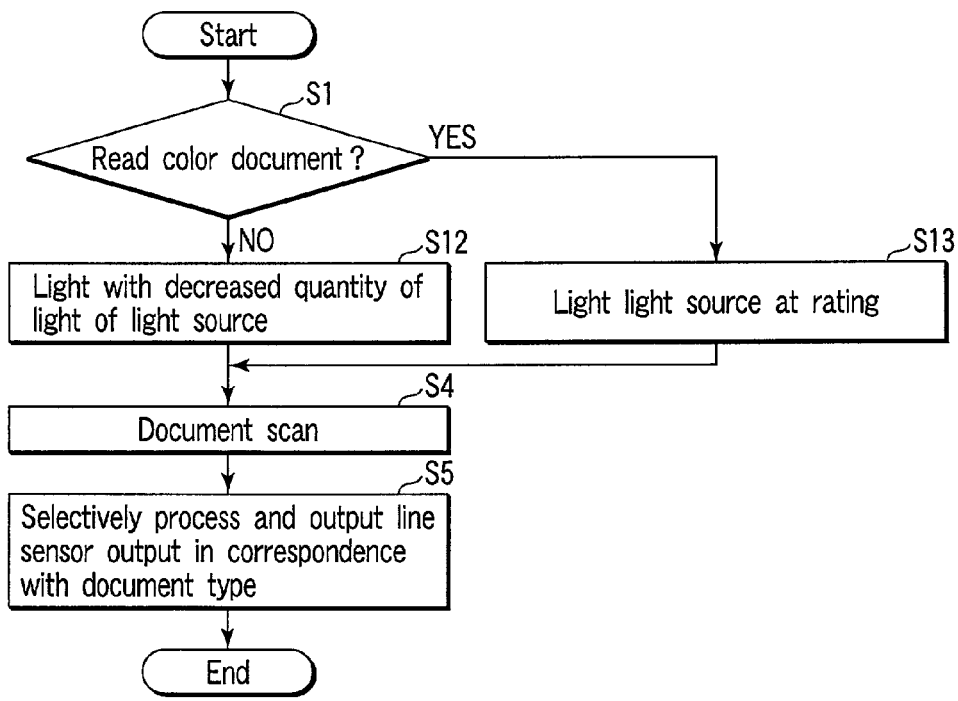
FIG. 11 is a flowchart showing the operation of a second embodiment.

Next, a second embodiment of the present invention will be described. The characterizing feature of this embodiment is that the light amount control of the light source is carried out in accordance with the type of the line sensor which is used. FIG. 11 is a flowchart showing the operation of the present embodiment. For example, when the monochrome document D is read by the line sensor BK, the CPU 100 uses the light source control section 108 to lower the light amount and light the light source 12 (step S12). When the color document D is read by the line sensors R, G, B, the CPU 100 uses the light source control section 108 to light the light source 12 at the rating (step S13). In this case, the light amount of the light source may be controlled such that the signal amplitude outputted from the line sensor BK coincides with the signal having the largest amplitude among the output signals of the line sensors R, G, B.

Due to this control, the intensity of the reflected light from the document D can be substantially the same at the line sensor BK and at the line sensors R, G, B when the white portion of a document is read. Further, in a case in which the light amount of the light source 12 is lowered to be less than the rating and is used, there are cases in which the spectral distribution characteristic of the light source 12 is changed. However, in a case in which this control is carried out, the document is a monochrome document. Thus, it suffices to detect only the density information and not the color information. Thus, even if the spectral characteristics change, no problems arise. Further, in a case in which the document D is single color, it is possible for the document D to be read only by the line sensor BK, and at that time as well, control which is similar to the reading of a monochrome document in which the light amount of the light source 12 is decreased can be carried out.

Figure 12A:
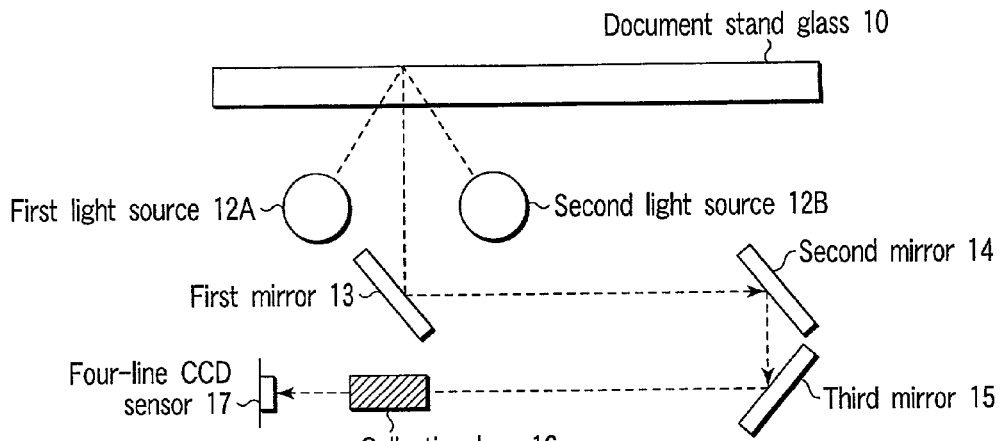
FIGS. 12A to 12C show the structure and the operation of a third embodiment.

Next, a third embodiment of the present invention will be described. The structure relating to the present embodiment is shown in FIG. 12. In this embodiment, as shown in FIG. 12A, the characterizing features are that two light sources 12A, 12B are provided, and a light source which emits light is controlled in accordance with the type of the line sensor. FIG. 13 is a flowchart showing the operation of the present embodiment.

Figure 12B:
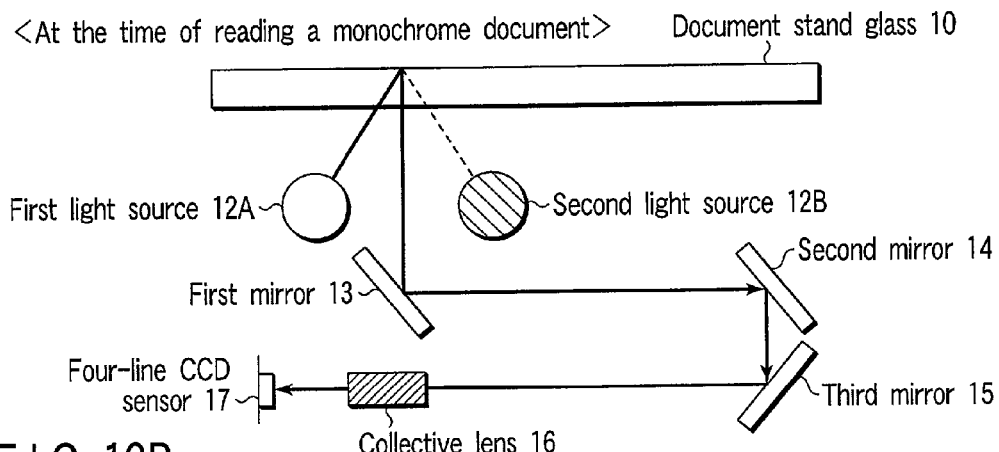
Figure 12C:
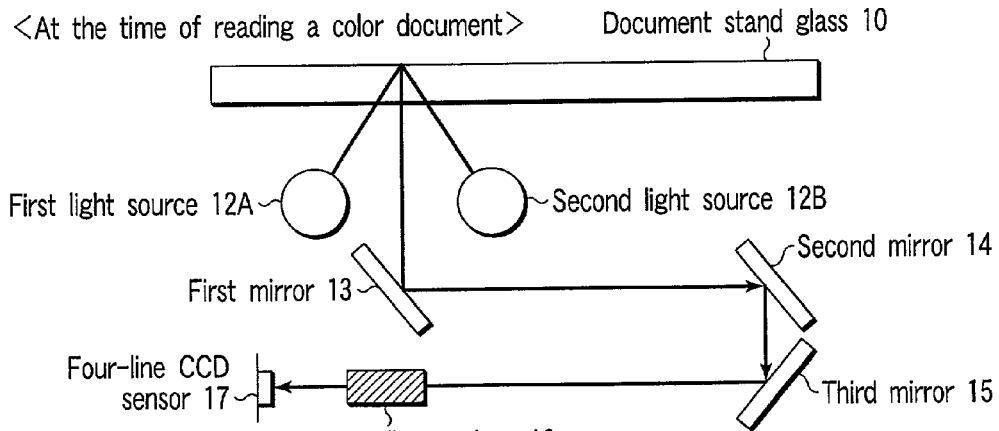
Figure 13:
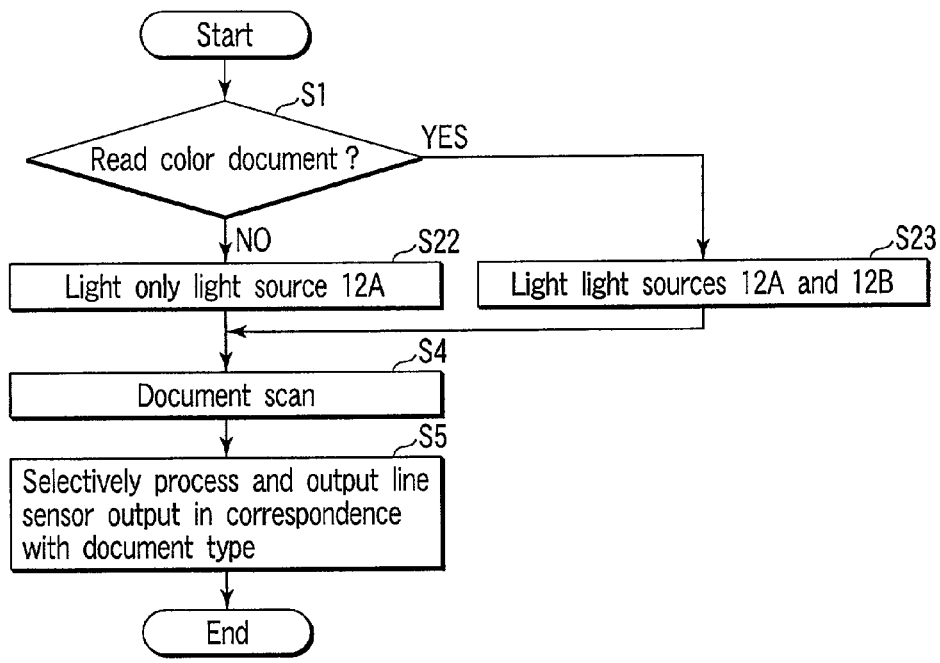
FIG. 13 is a flowchart showing the operation of the third embodiment.

When the monochrome document D is read by using the line sensor BK, as shown in FIG. 12B, the CPU 100 lights the light source 12A among two light sources, and turns off the light source 12B (step S22). Further, when the color document D is read by the line sensors R, G, B, the CPU 100 carries out the control to light both of the light source 12A and the light source 12B as shown in FIG. 12C (step S23). In this way, the intensity of the reflected light from the document can substantially the same at the line sensor BK and at the line sensors R, G, B when the same white portion is read.

In this case, the CPU 100 can set the light amount of the light source such that the amplitude of the signal which is outputted from the line sensor BK when the monochrome document is read with one of the light sources lit, coincides with the signal having the largest amplitude among the output signals of the line CCD sensors R, G, B when the color document is read with the two light sources lit.

Further, in a case in which the document D is single color, it is possible to read the document D only by the line sensor BK. At this time as well, control which is similar to that of monochrome document reading, in which the document D is read with only the light source 12A lit, can be carried out. Note that there is no problem if the arrangement of the light source 12A and the light source 12B is opposite to that in FIG. 12.

A combination of the above-described embodiments is also possible. Namely, when a monochrome document is read by the line sensor BK, the CPU 100 decreases the light amount of the light source 12 to an appropriate value. When a color document is read by the line sensors R, G, B, control can be effected to increase the light amount of the light source 12 as compared to the time of reading a monochrome document, or the electric power of the light source 12 is increased to the rated value, and the transfer frequency is made to be less than that at the time of reading a monochrome document.

FIG. 14 is a view showing the processing circuit structure and the signal waveform of an analog signal which is outputted from the CCD sensor, and FIG. 15 is a view showing the structure of a circuit relating to a fourth embodiment.

The analog processing circuit which is outputted from the CCD sensor is generally, as shown in FIG. 14A, structured by a coupling capacitor 20, a CDS (Correlated Double Sampling) circuit or a sample hold circuit 21, a gain amplifier section 22, a DAC (Digital Analog Converter) 23 which converts a digital signal to an analog signal, an offset removing circuit 24 for removing the DC component, and an ADC (Analog Digital Converter) section 25. Concrete operation will be described hereinafter by using FIG. 14B.

As shown in FIG. 8 as well, the output signal is outputted from the CCD line sensor with the signal output DC voltage (Vos) as a reference. The signal output DC voltage (Vos) differs in accordance with the CCD line sensor. In the case of a CCD line sensor which uses a +12V power source, there is a dispersion of about 3 to 8V. For the purpose of removing the DC component of a signal having an uncertain level, the coupling capacitor 20 is connected in series. At this time, the processing for matching the dummy pixel portion which is shown in FIG. 8 or the electric potential of the light shield portion to the reference electric potential (Vref) is carried out, and waveform shaping is carried out by the CDS circuit or the sampling circuit 21, and noise is removed.

Next, processing for matching the analog signal from the CCD line sensor, from which the DC component has been removed, to the input range of the latter-stage ADC section 25 is carried out. At this time, DC voltage is generated at the DAC section 23, and adjustment of the DC component is carried out again at the offset removing section 24 such that the voltage of the light shield portion of the CCD sensor matches the DC voltage.

In FIG. 14B, the 'H' level side reference voltage, which is needed for the converting operation of the ADC circuit, is an ADC reference (ref(+)), and the 'L' level side reference voltage is an ADC reference (ref(−)), and processing is carried out so as to be within this voltage range. At this time, if a signal which is greater than the ADC reference (ref(+)) or is less than the ADC reference (ref(−)) is inputted, because the output of the ADC circuit is saturated, the voltage is controlled so as to absolutely not exceed the aforementioned reference.

The fourth embodiment of the present invention relates to the gain amplifier section 22 of FIG. 14A. A simple circuit example of the gain amplifier section 22 is shown in FIG. 15.

Figure 15A:
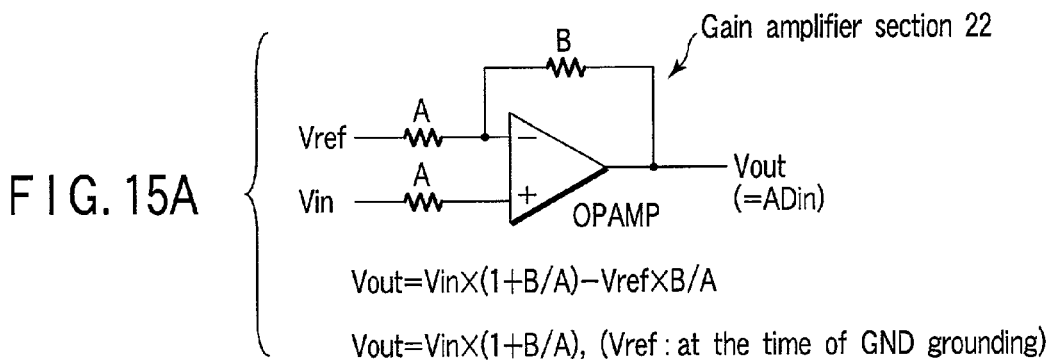
FIGS. 15A and 15B show a basic circuit of a gain amplifier section.
Figure 15B:
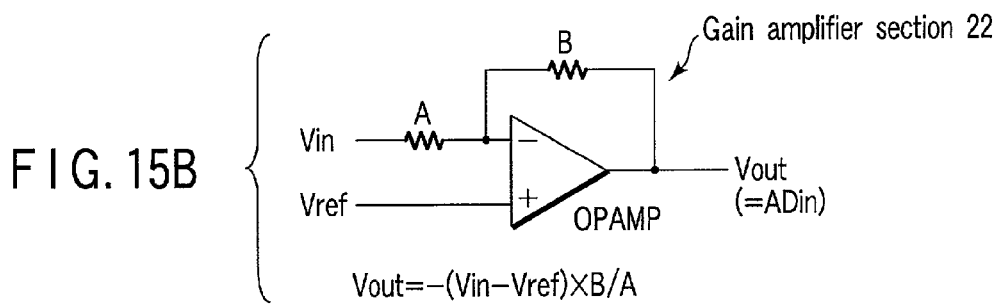

The gain amplifier section is structured by a resistor element A, a resistor element B, and an operating amplifier OPAMP. An example of a non-inverted amplification circuit is shown in FIG. 15A, and an example of an inverted amplification circuit is shown in FIG. 15B.

Non-inverted amplification circuit:

$$V_{out} = V_{in} \times (1+B/A) - V_{ref} \times B/A$$

Inverted amplification circuit:

$$V_{out} = (V_{in} - V_{ref}) \times B/A$$

As is clear from the above formulas, the amplification factor of the gain amplifier is determined by the ratio of the resistor elements A, B.

As described above, in the four-line CCD sensor 17, the sensitivities of the line sensor BK and the line sensors R, G, B greatly differ. Accordingly, in order to carry out the appropriate conversion at the ADC circuit 25 which is shown in FIG. 14A, the output signal amplitudes from the respective line sensors are made to match.

The resistor elements of the gain amplifier section 22 which processes the amplitude of the output signal of the line sensor BK are A(BK), B(BK), and the resistor elements of the gain amplifier section 22 which processes the amplitude of the output signal of the line sensor R are A(R), B(R), and the resistor elements of the gain amplifier section 22 which processes the amplitude of the output signal of the line sensor G are A(G), B(G), and the resistor elements of the gain amplifier section 22 which processes the amplitude of the output signal of the line sensor B are A(B), B(B).

In the present embodiment, the sensitivity of the line sensor BK and the ratio (B(BK)/A(BK)) of the resistance values of the resistor elements, and the sensitivity of the line sensor R and the ratio (B(R)/A(R)) or the resistor elements, and the sensitivity of the line sensor G and the ratio (B(G)/A(G)) of the resistor elements, and the sensitivity of the line sensor B and the ratio (B(B)/A(B)) of the resistor elements, are made to be appropriate.

For example, assuming that the sensitivity of the line sensor BK is R(BK), and the sensitivity R(R) of the line sensor R is R(BK)×½, the sensitivity R(G) of the line sensor G is R(BK)×⅓, and the sensitivity (B) of the line sensor B is R(BK)×¼, the respective resistor elements are set such that the following formulas are established.

$$B(R)/A(R) = 2 \times B(BK)/A(BK)$$

$$B(G)/A(G) = 3 \times B(BK)/A(BK)$$

$$B(B)/A(B) = 4 \times B(BK)/A(BK)$$

Therefore, the resistor elements of the gain amplifier section 22 of the output signal of the line sensor R are $$A(R) = A(BK), B(R) = 2 \times B(BK), \text{ or}$$

$$A(R) = (\tfrac{1}{2}) \times A(BK), B(R) = B(BK),$$

and the resistor elements of the gain amplifier section 22 of the output signal of the line sensor G are $$A(G) = A(BK), B(G) = 3 \times B(BK), \text{ or}$$

$$A(G) = (\tfrac{1}{3}) \times A(BK), B(G) = B(BK),$$

and the resistor elements of the gain amplifier section 22 of the output signal of the line sensor B are $$A(B) = A(BK), B(B) = 4 \times B(BK), \text{ or}$$

$$A(B) = (\tfrac{1}{4}) \times A(BK), B(B) = B(BK).$$

Due to the amplification factors of the gain amplifier section 22 being set such that the above relationships are established, the output signal amplitudes from the respective line sensors can be optimized at the input portion of the ADC section 25.

Even if the resistance values of the resistor elements A, B which are given in the above description are set to fixed resistances or are set to the volume resistances, because the functions are the same, there is no problem. Further, it is needless to say that, even if a resistance value varying means, which uses an electronic volume or the like which is controllable from an exterior circuit of the CPU or the like, is used, the same effects can be obtained.

Figure 16A:
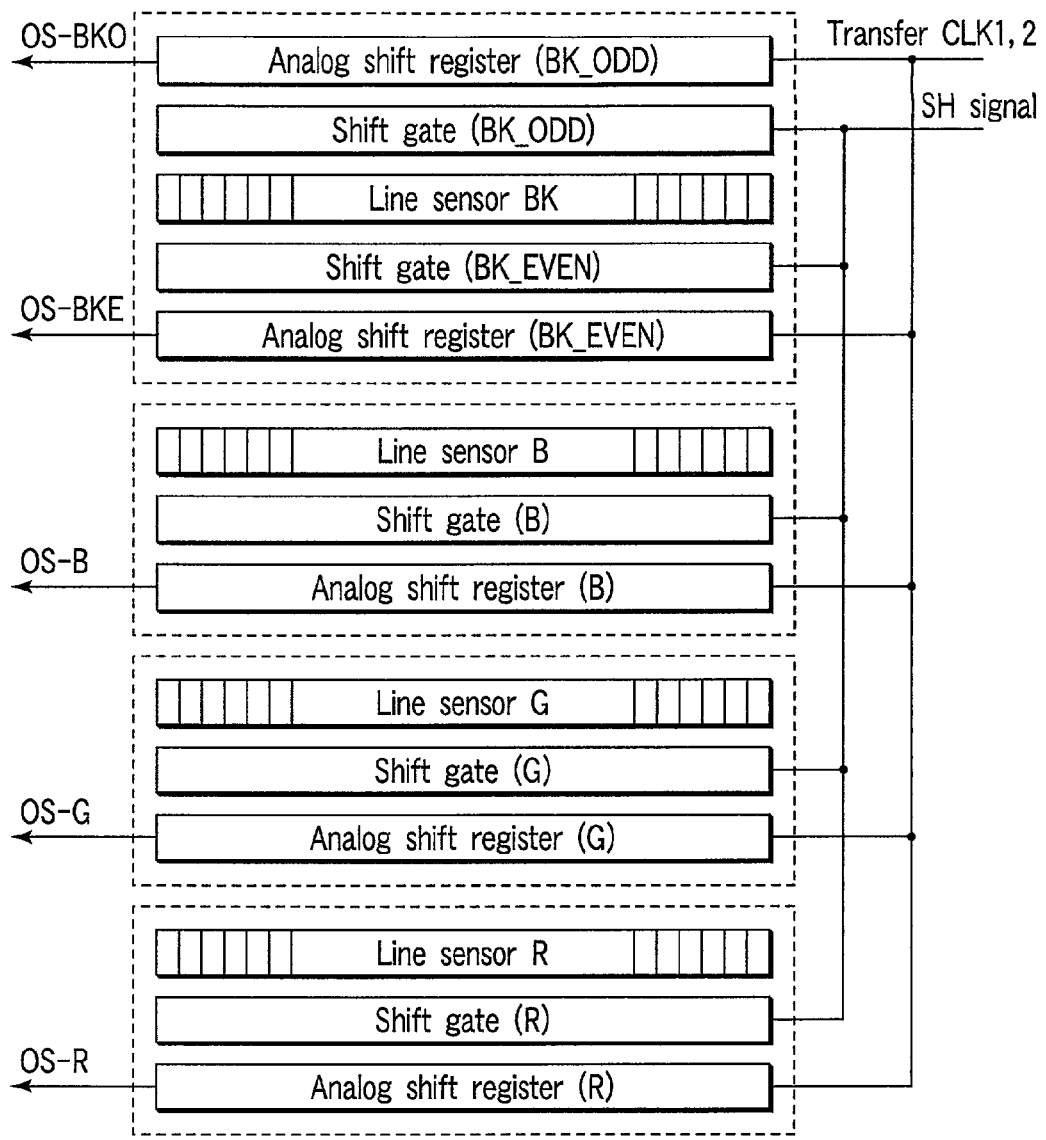
FIGS. 16A and 16B show the schematic structure and an output signal timing of a four-line CCD sensor in which a line sensor BK output is made to be 2CH.
Figure 16B:
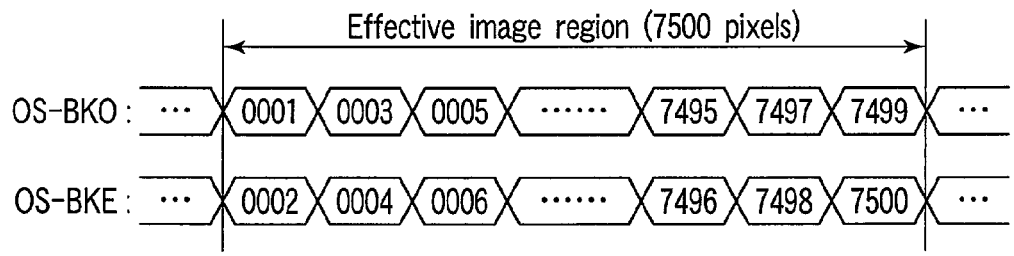

Next, fifth embodiment of the present invention will be described. It is described above that the sensitivity of the line sensor greatly differs in accordance with whether a color filter is disposed at the receiving light surface portion or not. As shown in FIGS. 16A and 16B, by utilizing, only at the line sensor BK at which no color filter is disposed, a dual system output mode which outputs the accumulated charges separately for the odd pixels and the even pixels, reading of single color documents, including monochrome documents, by using the line sensor BK can be made high-speed.

Description will be given by using, as an example, the case in FIG. 17 of a 7500 pixel CCD sensor. In the CCD sensor, in the same way as the single system output type output signal which is shown in FIG. 8, the empty feed portion, the light shield portion, the dummy pixel portion, and the effective pixel region are provided. However, the number of the transfer CLK which are needed for transferring all of pixels is half.

Considering the effective pixel region, in the case of FIG. 8, a number of CLK of 7500 is needed in correspondence with the 7500 pixels. However, in the dual system output type of FIG. 16, only a number of CLK of 3750, which is half, is needed.

Figure 17:
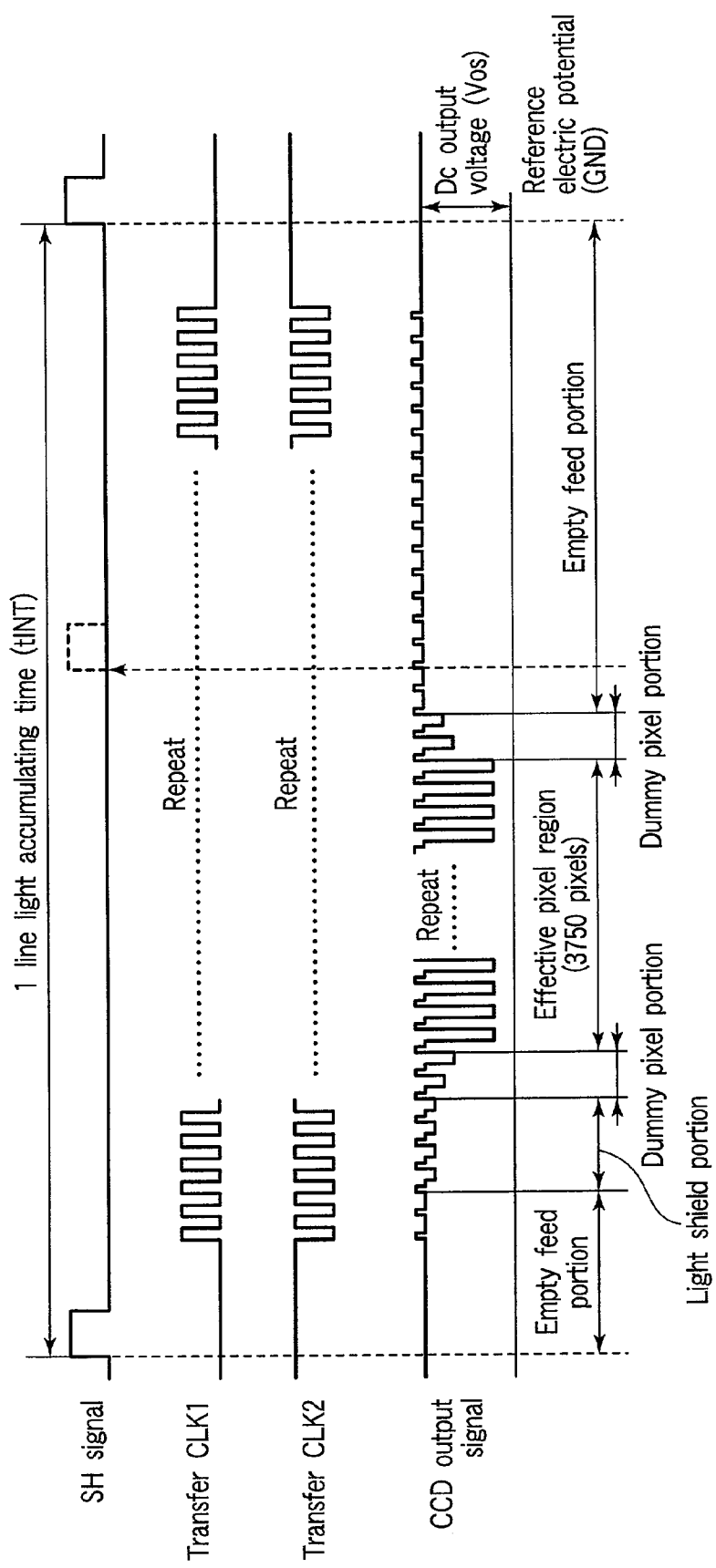
FIG. 17 shows a driving timing and an output waveform of the four-line CCD sensor which is shown in FIG. 16.

Therefore, the SH signal of FIG. 17 can be set at the portion which is depicted by the broken line, and the light accumulating time for one line can be set to be short. If the line sensor BK is used at the same light accumulating time and at the light amount appropriate for reading by the line sensors R, G, B at which color filters are disposed at the light receiving surface portions, the light energy which is incident on the line sensor BK is too great, and the accumulated charges leak to the adjacent pixels. Further, depending on the incident light amount, the fear that the output is saturated arises. However, by using the dual system output type CCD line sensor, at the time of using the line sensor BK, the SH signal period can be set to be short, namely, the light accumulating time for one line can be set to be short. Accordingly, even if the same light amount at the time of reading by the line sensors R, G, B is used for the line sensor BK, operation without the charges leaking to the adjacent pixels as described above is possible.

Further, in the above, a CCD line sensor having a dual circuit output mode is described. However, there are the same effects with a four system output as shown in FIGS. 18 and 19. Note that FIGS. 18 and 19 illustrate only the line sensor BK, and the line sensors R, G, B are not illustrated. Further, the line sensors R, G, B are the single system outputs in the same way as in FIG. 8.

Figure 18A:
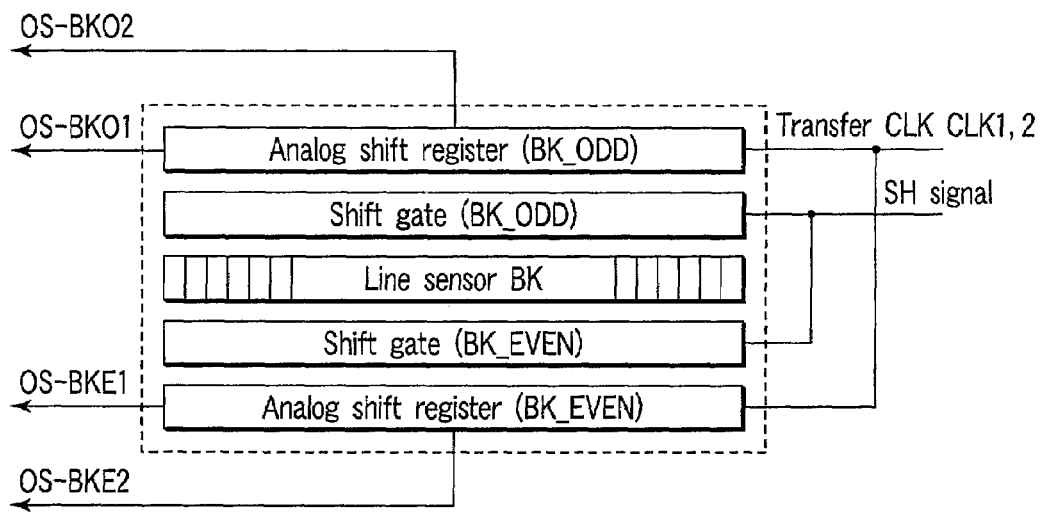
FIGS. 18A and 18B show a schematic structure and an output signal timing of another four-line CCD sensor in which a line sensor BK output is made to be 4CH.

FIG. 18A shows an example in which a four system output CCD line sensor is structured by separating the line sensor BK into the odd pixels and the even pixels, and by dividing into two an analog shift register for transferring odd pixels (BK-ODD) and an analog shift register for transferring even pixels (BK-EVEN).

Figure 18B:
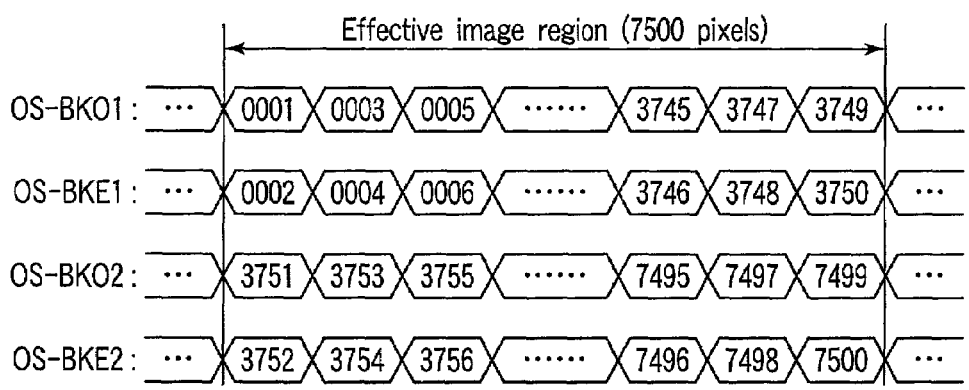

The order of the output signals in this structure is as shown in FIG. 18B. Namely, the orders of the odd pixel outputs OS-BKO1, OS-BKO2 and the even pixel outputs OS-BKE1, OS-BKE2 are as follows.

OS-BKO1: 1, 3, 5, 7, . . . , 3745, 3747, 3749
OS-BKE1: 2, 4, 6, 8, . . . , 3746, 3748, 3750
OS-BKO2: 3751, 3753, 3755, . . . , 7495, 7497, 7499
OS-BKE2: 3752, 3754, 3756, . . . , 7496, 7498, 7500

Figure 19A:
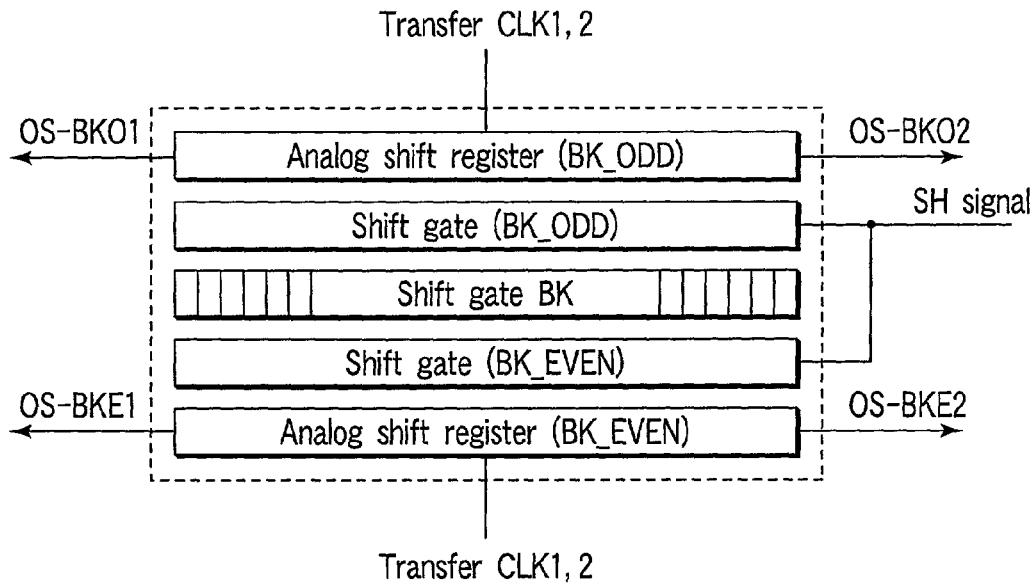
FIGS. 19A and 19B show a schematic structure and an output signal timing of yet another four-line CCD sensor in which a line sensor BK output is made to be 4CH.
Figure 19B:
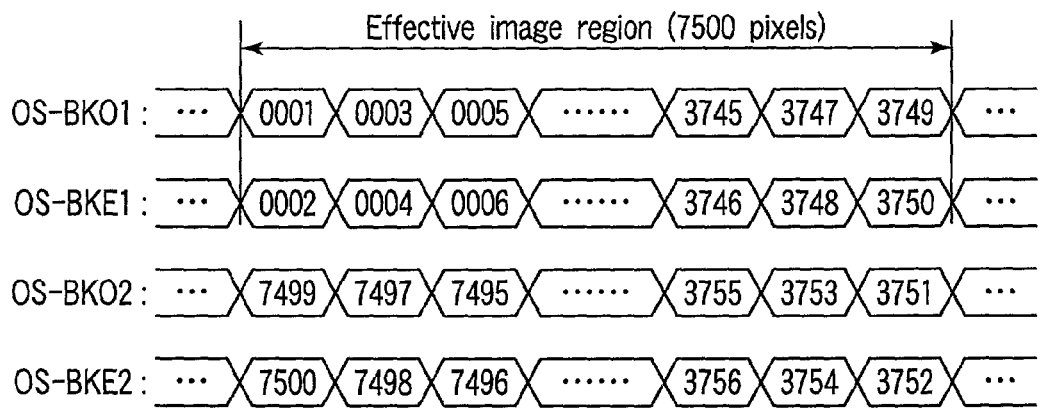

FIG. 19 shows another four system output structure. This CCD line sensor is a structure which separates the odd pixels and the even pixels, and outputs them from the both ends of the analog shift register for transferring odd pixels (BK-ODD) and the analog shift register for transferring even pixels (BK-EVEN). The orders of the output signals in this structure are as in FIG. 19B. Namely, the even pixel outputs OS-BKO1, OS-BKO2, and the odd pixel outputs OS-BKE1, OS-BKE2 are as follows.

OS-BKO1: 1, 3, 5, 7, . . . , 3745, 3747, 3749
OS-BKE1: 2, 4, 6, 8, . . . , 3746, 3748, 3750
OS-BKO2: 7499, 7497, 7495, . . . , 3755, 3753, 3751
OS-BKE2: 7500, 7498, 7496, . . . , 3756, 3754, 3752

The merit of the structure which is shown in FIG. 18A is that the orders of the pixel outputs of the odd pixel output OS-BKO2 and the even pixel output OS-BKE2 are in time series. The demerit of the structure is that, because the pixels are outputted from the intermediate portions of the analog shift register for transferring the odd pixels (BK-ODD) and the analog shift register for transferring the even pixels (BK-EVEN), there are limitations on the arrangement corresponding to the aforementioned intermediate portions of the photodiodes which are disposed on straight lines.

The merit of the embodiment of FIG. 19A is that there are no limitations on the aforementioned intermediate portions, which is described above as an example of the demerits of FIG. 18A. The demerit of the embodiment of FIG. 19A is that, because the odd pixel output OS-BKO2 and the even pixel output OS-BKE2 are outputted in a sequential order from the last stage of the photodiodes which are disposed on straight lines, the order of the pixels is inverted, and a processing for reordering the pixels is indispensable.

However, both FIG. 18 and FIG. 19 are effective means for high-speed driving the line memory BK.

In the above, the present invention is described as a scanner which is an image inputting apparatus using the four-line CCD sensor 17. However, it is needless to say that, by connecting the image inputting apparatus to an image forming apparatus, the present invention can be structured as a copy apparatus.

Figure 20:
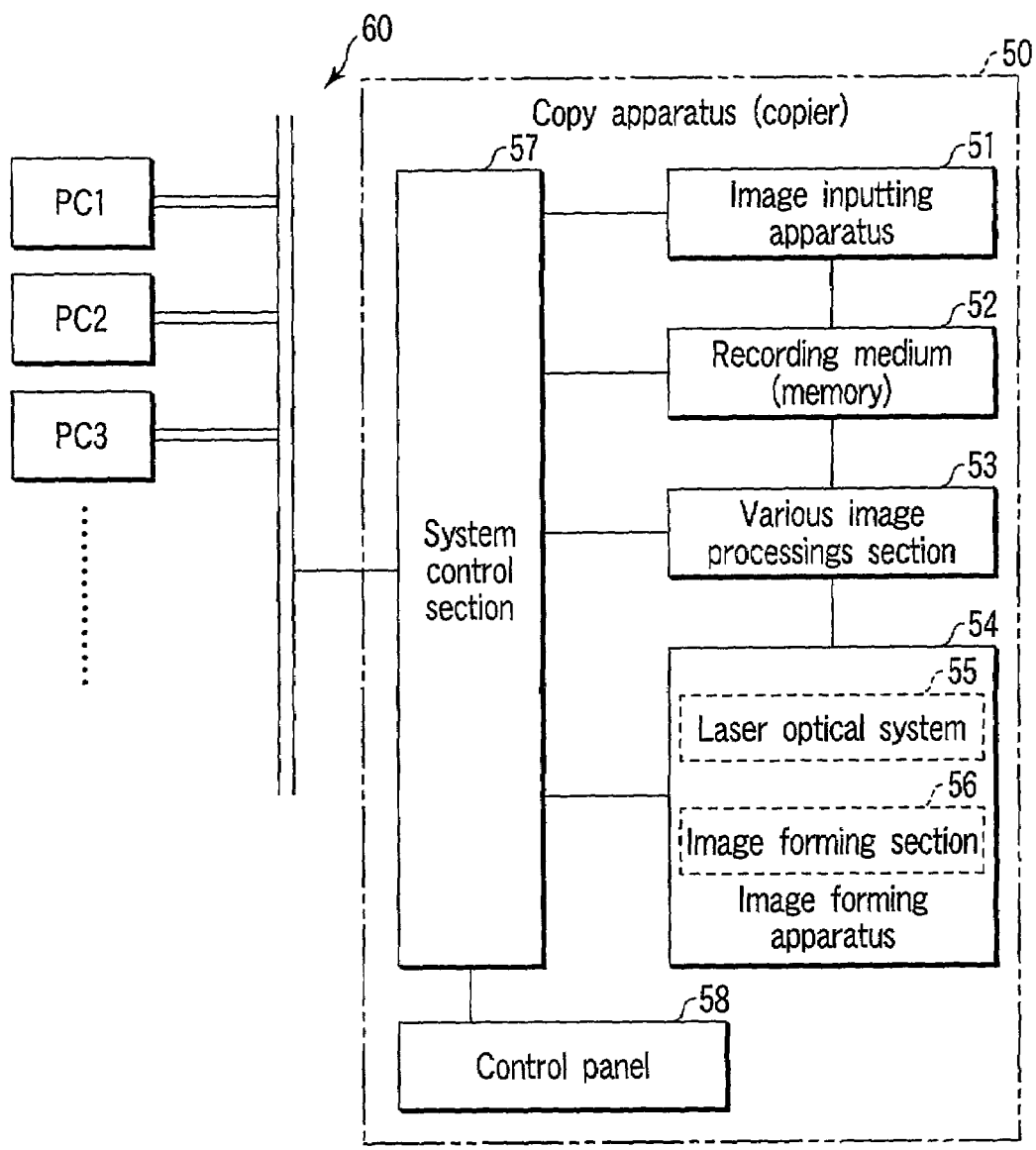
FIG. 20 shows an outline of a copy apparatus which is structured by an image inputting apparatus and an image forming apparatus.

FIG. 20 shows an outline view of a copy apparatus 50 which is structured by an image inputting apparatus and an image forming apparatus. The copy apparatus 50 is connected to external computers PC1, PC2, PC3, . . . via a network 60.

Figure 21:
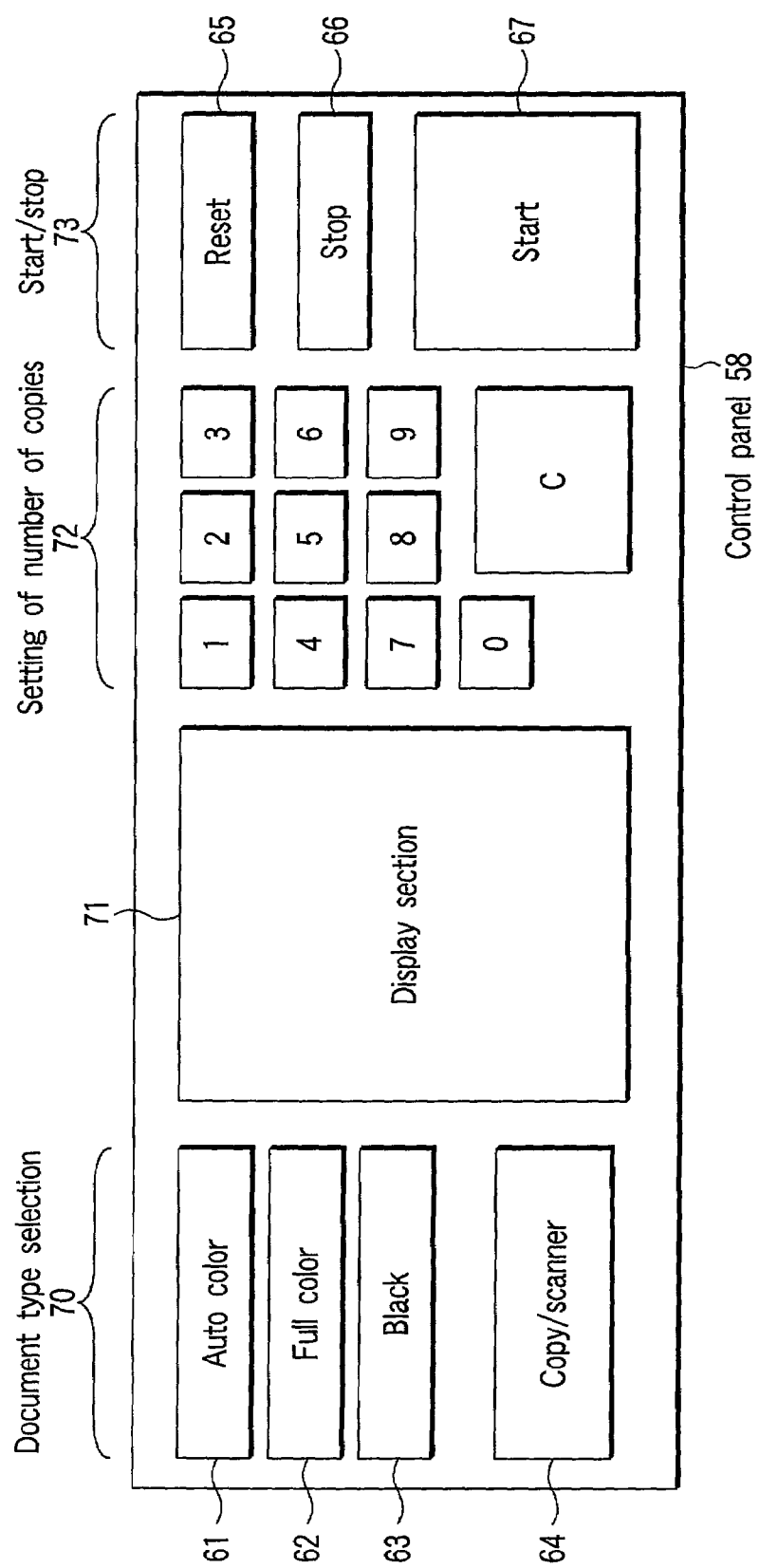
FIG. 21 shows an example of the structure of a control panel.

The copy apparatus 50 is formed from an image inputting apparatus 51, a memory 52 which is a recording medium, a various image processings section 53, an image forming apparatus 54, a system control section 57 which carries out control of all of these, and a control panel 58 at which the user carries out input directly. The image inputting apparatus 51 is a scanner which reads a document image by using the four-line CCD sensor 17 as in the first to fifth embodiments which are described above. The image forming apparatus 54 includes a laser optical system 55 using a semiconductor laser, and an image forming section 56 which forms an image with toner by using an electrophotographic process. FIG. 21 shows a concrete example of the control panel 58.

Figure 22A:
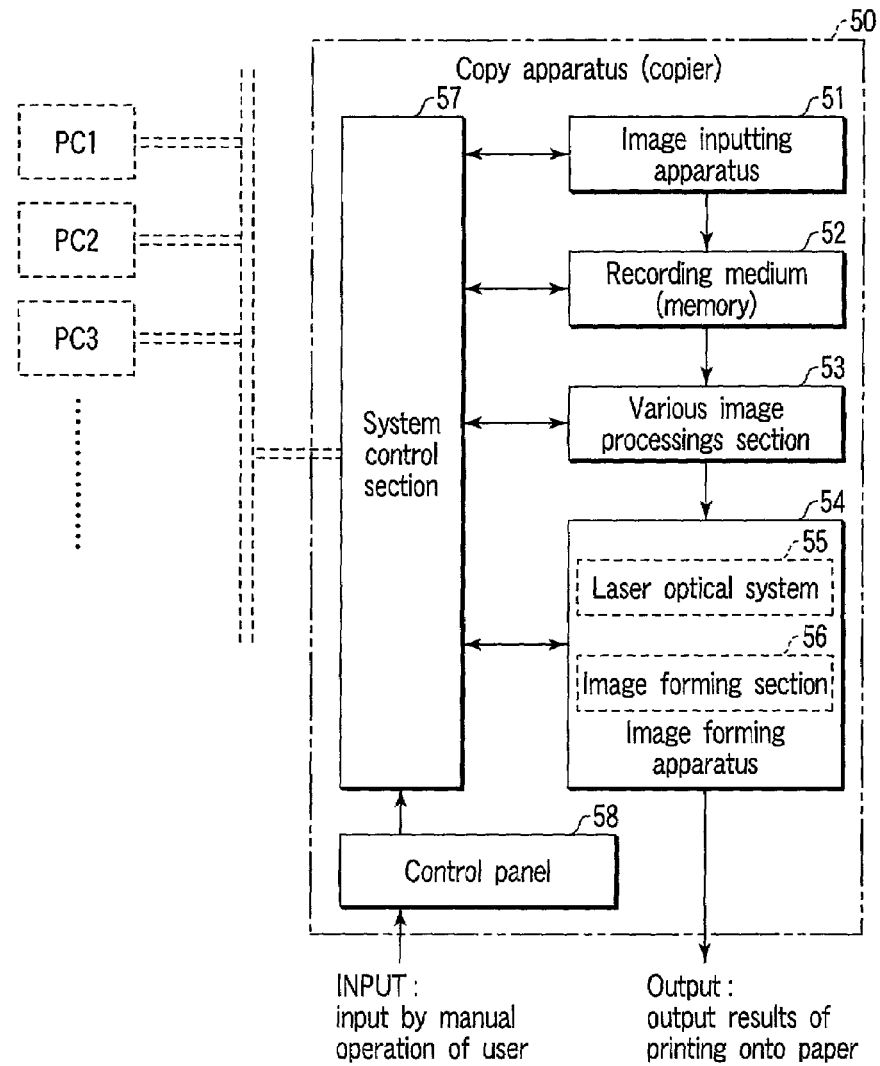
FIGS. 22A and 22B show copying operations in a copy apparatus which is structured by an image inputting apparatus and an image forming apparatus.
Figure 22B:
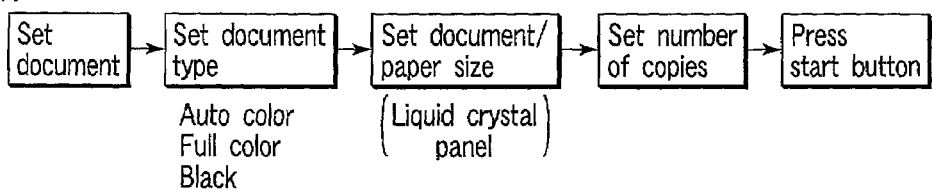

FIG. 22 is a view showing the operation in a case in which the copy apparatus is used on its own. First, as shown in FIG. 22B, the user sets on the image inputting apparatus 51 the document D which he/she wishes to copy, and carries out desired settings from the control panel 58 which is illustrated in FIG. 21. As shown in FIG. 21, the control panel 58 is structured by a document type selecting section 70, a display section 71 which is formed from an LCD or the like, a number of copies setting section 72, and a start/stop section 73. The document type selecting section 70 includes an auto color button 61 which is for sensing at the apparatus whether the document D is a monochrome document or a color document, a full color button 62 and a black button 63 by which the user sets the type of the document D in advance, and a copy/scanner button 64 which sets whether the copy apparatus 50 is to be used as a copy apparatus or as a scanner which is an image inputting apparatus. The display section 71 displays the processing contents such as enlargement/reduction or the like, and the number of pages which was set, and the like. The number of copies setting section 72 includes a ten-key of 0 to 9 for inputting the desired number of copies and a C button which is for clearing the inputted figure. The start/stop section 73 includes a reset button 65 which is for initializing the conditions set at the control panel 58, a stop button 66 which is for terminating the copy operation or the scanner operation in the midst of the operation, and a start button 67 which starts the copy operation or the scanner operation. This structure of the control panel 58 is an example, and for example, there are structures in which various setting buttons of the control panel are set in a display section which is structured by a touch panel using a liquid crystal.

As shown in FIG. 22B, when the document D is set, the cover 11 for document fixing is closed, and the type of the document, the page size, the number of copies to be formed for a document of one page, and the like are set by using the control panel 58. By pressing the start button 67, the copy operation starts. At this time, the image information which is read at the image inputting apparatus 51 is temporarily accumulated in the memory 52 which is a recording medium. The memory 52 is structured by a page memory having a larger capacity than a capacity which can store all of the image information of the largest size which can be copied. The image information which is outputted from the memory 52 is, at the various image processings section 53 of the subsequent stage, subjected to enlargement or equivalent magnification or reduction processing, and the RGB image information is converted to Y (yellow), M (magenta), C (cyan), K (black) signals for color reproduction by using toners, and is subjected to gradation correction and the like, and is converted into control signals of semiconductor lasers which are inputted to a laser optical system 55 at the subsequent stage. The image signals become the light output of the semiconductor lasers at the laser optical system 55, and the semiconductor lasers are irradiated onto a photosensitive body (not shown) of the image forming section 56. The image forming section 56 forms an image by an electrophotographic process.

At this time, in a case in which the type of the document D is set to be a monochrome document by the user or it is judged to be a monochrome document by automatic sensing, the reading operation is carried out by only the line sensor BK. Further, in a case in which the type of the document D is set to be a color document by the user or is judged to be a color document by automatic sensing, the output signal from the line sensor BK is ignored, and the reading operation by using the line sensors R, G, B is carried out.

Figure 23A:
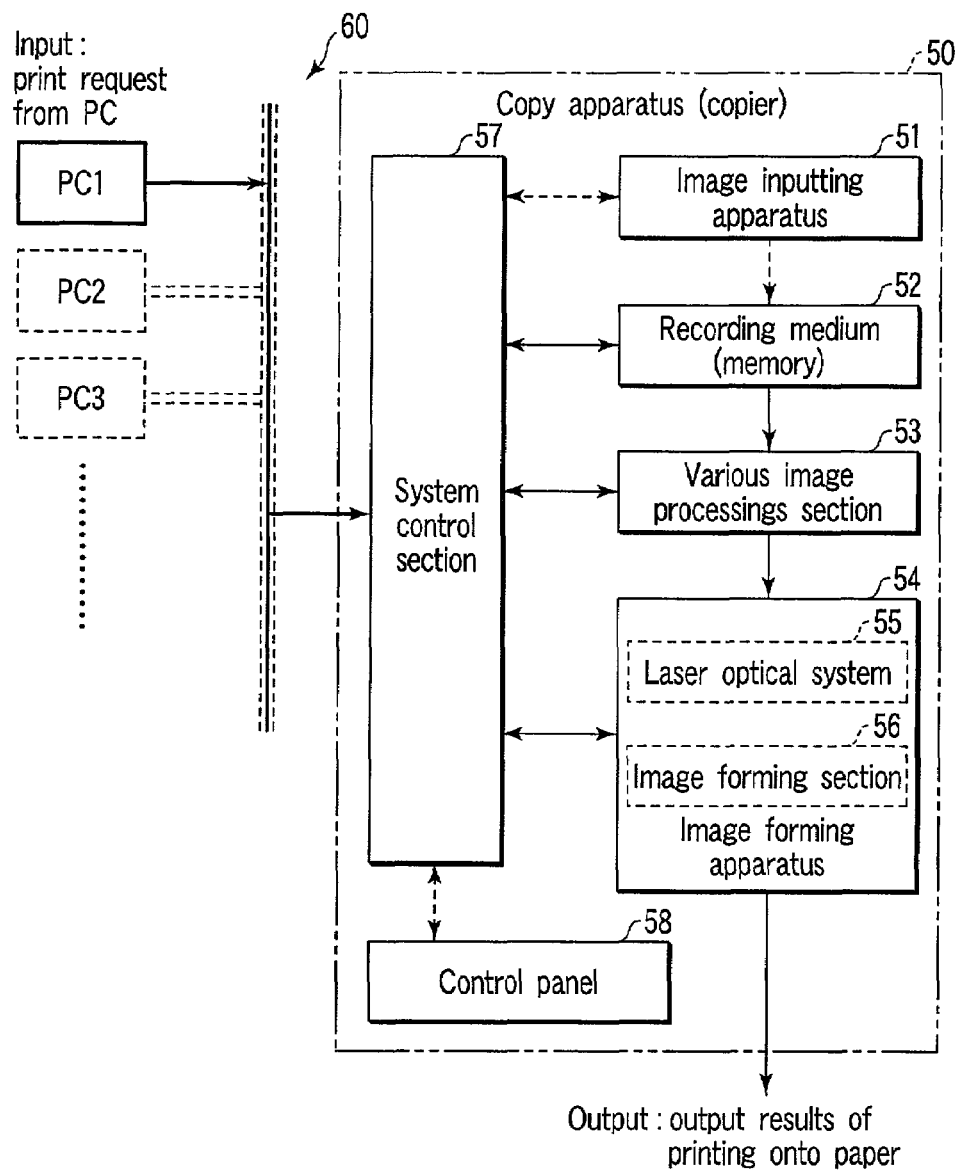
FIGS. 23A and 23B are explanatory figures in a case in which a copy apparatus, which is structured by an image inputting apparatus and an image forming apparatus, is used as a network printer.
Figure 23B:
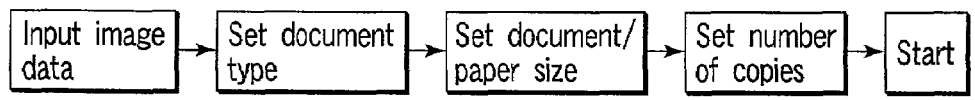

FIG. 23 shows an example of operation as a network printer which prints image information from an external computer by the network connection via the system control section 57. At the time of this operation, the image information which is outputted from an external computer, for example, the PC1, is stored in the memory 52 via the system control section 57. Thereafter, in the same way as in the copy operation, the image is printed onto a paper at the image forming section 54 via the various image processings section 53, and is outputted.

Figure 24A:
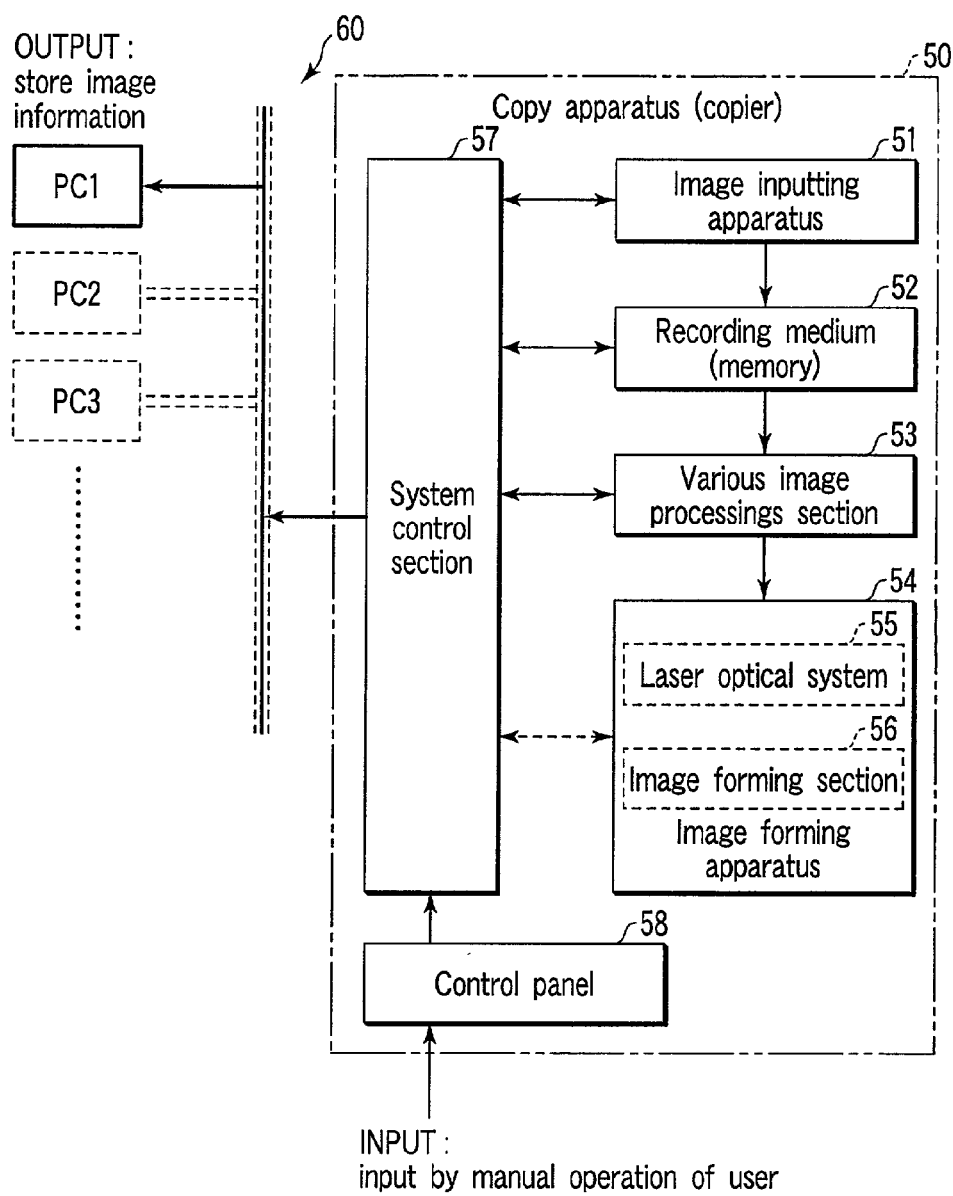
FIGS. 24A and 24B are explanatory figures in a case in which a copy apparatus, which is structured by an image inputting apparatus and an image forming apparatus, is used as a network scanner.

FIG. 24 shows an example of operation as a network scanner which outputs the image information, which is read by using the image inputting apparatus 51, to the computer by network connection via the system control section 57.

Figure 24B:
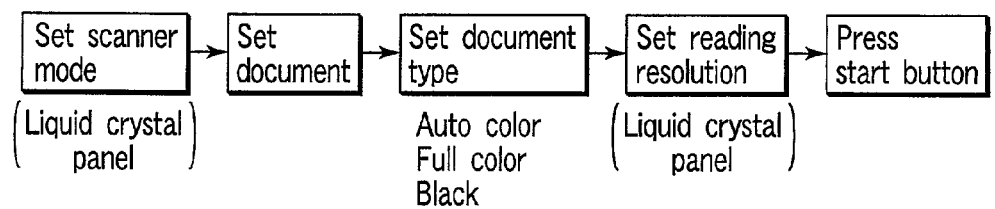

As shown in FIG. 24B, the user sets the document D at the scanner which is the image inputting apparatus 51, and sets the type of the document D, the size of the document D, the reading resolution, and scanner operation at the control panel 58. Further, the address of the computer PC1, which is connected to the network and is the sending destination of the image information, is set, and by pressing the start button, the operation starts. The image information which is read at the image inputting apparatus 51 is stored in the memory 52, and thereafter, a desired compression processing such as JPEG or PDF format is carried out at the various image processings section 53 which is the subsequent stage. The compressed image information is transferred to the external computer PC1 through the network 60 via the system control section 57.

At this time, in a case in which the type of the document D is set to be a monochrome document by the user or judged to be a monochrome document by automatic sensing, the reading operation is carried out by only the line sensor BK. Further, in a case in which the type of the document D is set to be a color document by the user or is judged to be a color document by automatic sensing, the output signal from the line sensor BK is ignored, and reading operation by using the line sensors R, G, B is carried out.

Further, whether the image information is image information which is read by only the line sensor BK or is image information which is read by using the line sensors R, G, B can be simultaneously attached and transferred to the external computer PC1.

As described above, in accordance with the present invention, in a case in which a document is read by using a four-line CCD sensor, which is structured by a three-line CCD sensor for reading a color document in which color filters are disposed on the surfaces of the light receiving element and a CCD sensor at which no color filter is disposed, in the case of a monochrome document or a single color document, the document can be read at high speed, and in the case of a color document, reading with high gradation reproducibility can be carried out.

Further, conventionally, when a monochrome document is read by using a color scanner having the three-line CCD sensor which is described above, at the portions at which the image information changes from white to black or from black to white, there is a so-called coloring phenomenon in which a false color is generated due to the difference in the physical positions of the respective line sensors. However, by using a color scanner having the four-line CCD sensor of the present invention, the above-described coloring phenomenon does not arise.

Further, in accordance with the present invention, by setting two or more output systems of the CCD line sensor at which no color filter is disposed, it is possible to read an image at high speed by using the same light source as at the time of carrying out the reading operation using the three-line CCD sensor in which the color filters are disposed.

What is claimed is:

1. An image inputting apparatus which reads a document optically and provides image information which corresponds to a document image, the image inputting apparatus comprising:
   a light source which irradiates light onto the document;
   a four-line CCD sensor which includes a first CCD line sensor which is structured by a three-line CCD sensor in which color filters are respectively disposed on surfaces of light receiving elements, and a second CCD line sensor which is structured by a one-line CCD sensor in which no color filter is disposed, the four-line CCD sensor receiving reflected light from the document and providing an image signal which corresponds to the reflected light;
   a driving section which supplies a signal including an image transfer clock to the four-line CCD sensor, and drives the four-line CCD sensor;
   adjusting section which adjusts an amplitude of at least one signal among signals outputted from the first CCD line sensor when a color document is read and an amplitude of a signal which is outputted from the second CCD line sensor when a monochrome document is read, to be substantially equal to one another; and
   a selecting section which selectively provides output of the first CCD line sensor in a case in which a color document is read, and selectively provides output of the second CCD line sensor in a case in which a monochrome document is read.

2. An apparatus according to claim 1, wherein the adjusting section adjusts one signal amplitude among signals which are outputted from the first CCD line sensor, and an amplitude of a signal which is outputted from the second CCD line sensor when a single color document is read, to be substantially equal to one another, and
   the selecting section selectively provides the output of the second CCD line sensor in a case in which the single color document is read.

3. An apparatus according to claim 1, wherein, at a time of reading a color document and at a time of reading a monochrome document, the adjusting section changes a one scan line reading time of a document by changing a frequency of the image transfer clock which is supplied from the driving section to the four-line CCD sensor.

4. An apparatus according to claim 3, wherein the adjusting section sets an image transfer frequency at a time of reading a color document to be lower than that at a time of reading a monochrome document.

5. An apparatus according to claim 1, wherein the adjusting section includes a light amount changing section which changes a light amount of the light source at a time of reading a color document and at a time of reading a monochrome document.

6. An apparatus according to claim 5, wherein the light amount changing section sets the light amount at the time of reading a color document to be greater than that at the time of reading a monochrome document.

7. An apparatus according to claim 5, wherein the light amount changing section controls the light amount of the light source such that an amplitude of a signal which is outputted from the second CCD line sensor coincides with an amplitude of a signal whose amplitude is largest among output signals of a three-line CCD sensor which forms the first CCD line sensor.

8. An apparatus according to claim 1, wherein a plurality of light sources are provided, and the adjusting section turns on the plurality of light sources at a time of reading a color document, and turns on one light source among the plurality of light sources at a time of reading a monochrome document.

9. An apparatus according to claim 8, wherein the adjusting section sets a light amount of the light source such that an amplitude of a signal which is outputted from the second CCD line sensor when a monochrome document is read by turning on one of the plurality of light sources coincides with an amplitude of a signal whose amplitude is largest among output signals of a three-line CCD sensor which forms the first CCD line sensor.

10. An apparatus according to claim 1, wherein the adjusting section includes first to third amplifiers which amplify, at first to third amplification factors respectively, output signals of the three-line CCD line sensor which forms the first CCD line sensor, and a fourth amplifier which amplifies an output signal of the second CCD line sensor at a fourth amplification factor which is less than the first to third amplification factors.

11. An apparatus according to claim 10, wherein the adjusting section controls the amplification factors of the first to fourth amplifiers such that amplitudes of the output signals of the three-line CCD sensor which forms the first CCD line sensor and a signal amplitude which is outputted from the second CCD line sensor all coincide.

12. An apparatus according to claim 1, wherein outputs of a plurality of light receiving elements which form the second CCD line sensor are divided into a plurality of groups, and respective groups output serial image signals simultaneously.

13. An apparatus according to claim 1, wherein outputs of a plurality of light receiving elements which form the second CCD line sensor are divided into a plurality of groups, and respective groups output serial image signals simultaneously, and wherein light amounts of the light source are the same at a time of reading a color document and at a time of reading a monochrome document.

14. An apparatus according to claim 1, further comprising:
a user interface which is for a user to designate whether a document is a color document, a monochrome document or a single color document,
wherein in a case in which the document is designated to be a color document by the user interface, the selecting section selects and provides output of a three-line CCD sensor which forms the first CCD line sensor, and in a case in which the document is designated to be one of a monochrome document and a single color document, the selecting section selects and provides output of the second CCD line sensor.

15. An apparatus according to claim 1, further comprising:
a document automatic sensing section which senses whether a document is a color document, a monochrome document or a single color document,
wherein in a case in which the document is detected to be a color document by the document automatic sensing section, the selecting section selects and provides output of a three-line CCD sensor which forms the first CCD line sensor, and in a case in which the document is detected to be one of a monochrome document and a single color document, the selecting section selects and provides output of the CCD line sensor in which no color filter is disposed.

16. An apparatus according to claim 1, wherein the image inputting apparatus is connected to a network and is used as a network scanner, and when the image inputting apparatus transmits image information to a computer which is connected via the network, the image inputting apparatus simultaneously transmits an identification signal which expresses whether an image is a color image which is read by using the color filters or a monochrome image which is read without using a color filter.

17. An image forming apparatus which reads a document optically and forms an image which corresponds to a document image, the image forming apparatus comprising:
a light source which irradiates light onto the document;
a four-line CCD sensor which includes a first CCD line sensor which is structured by a three-line CCD sensor in which color filters are respectively disposed on surfaces of light receiving elements, and a second CCD line sensor which is structured by a one-line CCD sensor in which no color filter is disposed, the four-line CCD sensor receiving reflected light from the document and providing an image signal which corresponds to the reflected light;
a driving section which supplies a signal including an image transfer clock to the four-line CCD sensor, and drives the four-line CCD sensor;
adjusting section for adjusting an amplitude of at least one signal among signals which are outputted from the first CCD line sensor at a time of reading a color document, and an amplitude of a signal which is outputted from the second CCD line sensor at a time of reading a monochrome document, to be substantially equal to one another;
a selecting section which selectively provides output of the first CCD line sensor in a case in which a color document is read, and selectively provides output of the second CCD line sensor in a case in which a monochrome document is read; and
an image forming section which forms an image on a medium on which an image is to be formed, on the basis of image signals which are selectively provided from the selecting section.

18. An apparatus according to claim 17, wherein the adjusting section changes a one scan line reading time of a document by changing a frequency of the image transfer clock which is supplied from the driving section to the four-line CCD sensor, at a time of reading a color document and at a time of reading a monochrome document.

19. An apparatus according to claim 17, wherein the adjusting section includes a light amount changing section which changes a light amount of the light source at the time of reading a color document and at the time of reading a monochrome document.

20. An image inputting method which reads a document optically and provides image data which corresponds to a document image, the image inputting method comprising the steps of:

irradiating light onto the document;

supplying a signal including an image transfer clock to a four-line CCD sensor, and driving the four-line CCD sensor, wherein the four-line CCD sensor includes a first CCD line sensor which is structured by a three-line CCD sensor in which color filters are respectively disposed on surfaces of light receiving elements and a second CCD line sensor which is structured by a one-line CCD sensor in which no color filter is disposed, and receiving reflected light from the document, and providing an image signal which corresponds to the reflected light;

adjusting an amplitude of at least one signal among signals which are outputted from the first CCD line sensor at a time of reading a color document and an amplitude of a signal which is outputted from the second CCD line sensor at a time of reading a monochrome document, to be substantially equal to one another; and selectively providing output of the first CCD line sensor in a case in which a color document is read, and selectively providing output of the second CCD line sensor in a case in which a monochrome document is read.

* * * * *